(12) United States Patent
Shimanaka et al.

(10) Patent No.: US 8,546,502 B2
(45) Date of Patent: Oct. 1, 2013

(54) METHOD FOR PRODUCING DYE POLYMER, DYE POLYMER AND USE OF THE SAME

(75) Inventors: Hiroyuki Shimanaka, Chuo-ku (JP); Toshiyuki Hitotsuyanagi, Chuo-ku (JP); Yoshikazu Murakami, Chuo-ku (JP); Atsushi Goto, Uji (JP); Yoshinobu Tsujii, Uji (JP); Takeshi Fukuda, Uji (JP)

(73) Assignees: Dainichiseika Color & Chemicals Mfg. Co., Ltd., Chuo-ku, Tokyo (JP); Kyoto University, Kyoto-shi, Kyoto (JP)

( * ) Notice: Subject to any disclaimer, the term of this patent is extended or adjusted under 35 U.S.C. 154(b) by 0 days.

(21) Appl. No.: 12/737,239

(22) PCT Filed: Jun. 26, 2009

(86) PCT No.: PCT/JP2009/061705
§ 371 (c)(1),
(2), (4) Date: Dec. 20, 2010

(87) PCT Pub. No.: WO2009/157536
PCT Pub. Date: Dec. 30, 2009

(65) Prior Publication Data
US 2011/0112242 A1    May 12, 2011

(30) Foreign Application Priority Data

Jun. 27, 2008    (JP) .................... 2008-168361

(51) Int. Cl.
C08F 2/00    (2006.01)
C08F 4/00    (2006.01)
C08L 33/06    (2006.01)

(52) U.S. Cl.
USPC ........... 526/193; 526/204; 526/208; 526/210; 524/560

(58) Field of Classification Search
USPC ................ 524/560; 526/193, 204, 208, 210
See application file for complete search history.

(56) References Cited

FOREIGN PATENT DOCUMENTS

| | | |
|---|---|---|
| JP | 1963-013530 B | 7/1963 |
| JP | 1964-003980 B | 4/1964 |
| JP | 1974-010690 B | 3/1974 |
| JP | 1985-027697 B | 7/1985 |
| JP | 2000-500516 A | 1/2000 |
| JP | 2000-514479 A | 10/2000 |
| JP | 2000-515181 A | 11/2000 |
| JP | 2005-345512 A | 12/2005 |
| JP | 2005-352053 A | 12/2005 |
| JP | 2006-16488 * | 1/2006 |
| JP | 2006-016488 A | 1/2006 |
| JP | 2006-167674 * | 6/2006 |
| JP | 2006-0167674 A | 6/2006 |
| JP | 2007-277533 A | 10/2007 |
| WO | WO 97/18247 A1 | 5/1997 |
| WO | WO 98/01478 A1 | 1/1998 |
| WO | WO 98/01480 A1 | 1/1998 |
| WO | WO 99/05099 A1 | 2/1999 |

OTHER PUBLICATIONS

Shimizu Itaru, JP2006016488 (Jan. 2006), English Translation.*
Shimizu Itaru et al., JP2006167674 (Jun. 2006), English Translation.*
Hawker, C., et al., New Polymer Synthesis by Nitroxide Mediated Living Radical Polymerizations, Chemical Review, vol. 101, No. 12, 2001, pp. 3661-3688.
Kamigaito, M., et al., Metal-Catalyzed Living Radical Polymerization, Chemical Review, vol. 101, No. 12, 2001, pp. 3689-3745.
Yamago, S., et al., Organotellurium Compounds as Novel Initiators for Controlled/Living Radical Polymerizations, Journal of the American Chemical Society, vol. 124, No. 12, 2002, pp. 2874-2875.
Yamago, S., et al., Tailored Synthesis of Structurally Defined Polymers by Organotellurium-Mediated Living Radical Polymerization (TERP), Journal of the American Chemical Society, vol. 124, No. 46, 2002, pp. 13666-13667.
Goto, A., et al., Mechanism-Based Invention of High-Speed Living Radical Polymerization Using Organotellurium Compounds and Azo-Initiators, Journal of the American Chemical Society, vol. 125, No. 29, 2003, pp. 8720-8721.

* cited by examiner

*Primary Examiner* — William Cheung
(74) *Attorney, Agent, or Firm* — Chapman and Cutler LLP

(57) ABSTRACT

Disclosed are a production process of a dye polymer having a dye content of from 1 to 50 wt %, and the dye polymer and its use. The production process includes subjecting an addition-polymerizable monomer to living radical polymerization by using, as a polymerization initiator, a dye having a polymerization initiating group enabling the living radical polymerization. The dye polymer and a composition of the dye polymer and a pigment are useful as good coloring agents for various products or articles. The colored products or articles are high in transparency, and are provided with high added value. The dye polymer can also be used as a dispersant for pigments, thereby making it possible to afford pigment dispersions excellent in dispersion properties and dispersion stability.

10 Claims, No Drawings

METHOD FOR PRODUCING DYE POLYMER, DYE POLYMER AND USE OF THE SAME

This application is a 35 U.S.C. 371 National Stage application of International Application Number PCT/JP2009/061705 filed on Jun. 26, 2009, which claimed priority of Japan Patent Application Number 2008-168361 filed on Jun. 27, 2008. The contents of the aforementioned applications are hereby incorporated by reference.

TECHNICAL FIELD

This invention relates to a production process of a dye polymer, the dye polymer and its use. According to the present invention, the dye polymer which is formed of a dye and a polymer bonded together via a covalent bonds can be easily produced with a high polymerization yield at low price, and moreover, the dye polymer can be obtained by a novel polymerization process that uses materials, which do not place much load on the environment, without needing any special compound or compounds. The dye polymer is useful, either singly or as a composition with a pigment, as a coloring agent for various applications.

BACKGROUND ART

Dye polymers, each of which is formed of a polymer of an addition-polymerizable monomer and a dye bonded together, are conventionally known, and by various production processes, typically by radical polymerization processes, these dye polymers can be obtained from various compounds. Examples of these production processes include a process that copolymerizes a dye monomer, which is formed of a dye and an addition-polymerizable, unsaturated bond introduced therein, with another radically-polymerizable monomer (Patent Document 1 and Patent Document 2), and a process that reduces a dye, which contains a nitro group, to form an amino group, diazotizes the amino group into a radical generating group, and by using the resultant compound as a radical polymerization initiator, subjects an addition-polymerizable monomer to radical polymerization (Patent Document 3 to Patent Document 5).

In addition, a living radical polymerization process has also been developed, which is a novel and precise polymerization process that initiates polymerization from a specific initiating group. This living radical polymerization process generally means a process that stabilizes the polymerizable radical end with a stable group, causes the stable end group to dissociate under the action of heat or a catalyst to form a radical at the end of the polymer, and polymerizes a monomer at the moment of the dissociation. The existence of a compound, which has a stable group, in a polymerization system results in immediate bonding of the stable group to the polymer radical so that the radical end of the polymer is stabilized. This process prevents a bimolecular termination reaction or disproportionation reaction as a side reaction of radical polymerization and does not deactivate the radical as a reactive end, that is, a "living" radical polymerization process.

In this living radical polymerization process, the polymerization proceeds as time goes on, and based on the amount of polymerization initiating groups at the initiation of the reaction, the molecular weight of a polymer is determined and controlled, and the molecular weight distribution of the resulting polymer can be controlled very narrow (molecular weight distribution, PDI: 1 to 1.3). Upon addition of a next supply of the monomer after the completion of the polymerization, polymerization is resumed to enable block polymerization to afford a block copolymer although such block copolymerization can be hardly conducted by the conventional radical polymerization. This living radical polymerization process also features that the selection of appropriate initiating groups makes it possible to produce polymers of various higher structures, such as graft copolymers and star polymers.

Developed as specific examples of the above-described living radical polymerization process include the nitroxide mediated polymerization (NMP) process that makes use of dissociation and bonding of amine oxide radicals (Non-patent Document 1), the atom transfer radical polymerization (ATRP) process that polymerizes a monomer in the presence of a halogen compound as a polymerization initiator by using a heavy metal such as copper, ruthenium, nickel or iron and a ligand capable of forming a complex with such a metal (Patent Document 6, Patent Document 7, and Non-patent Document 2), the reversible addition-fragmentation transfer (RAFT) process that subjects an addition-polymerizable monomer to radial polymerization by using a dithiocarboxylate ester, a xanthate compound or the like as a polymerization initiator (Patent Document 8), the macromolecular design via interchange of xanthate (MADIX) process (Patent Document 9), the degenerative transfer (DT) process that makes use of a heavy metal such as an organotellurium compound, organobismuth compound, organoantimony compound, antimony halide, organogermanium compound or germanium halide (Patent Document 10 and Non-patent Document 3), and so on. Extensive research and development work is underway on the living radical polymerization process.

The use of the above-described process is considered possible to obtain a dye polymer by introducing an initiating group, which can induce living radical polymerization, into a dye and conducting living radical polymerization by using the initiating group. For example, a dye polymer formed of a pigment and a polymer bonded thereto has been obtained by the atom transfer radical polymerization (ATRP) process, in which a sulfonated chloride group or brominated alkyl group is introduced into an organic pigment and an addition-polymerizable monomer is polymerized by using, as a polymerization initiator, the resulting derivative and as a catalyst, a copper compound and a ligand capable of forming a complex with the copper compound (Patent Document 11). In accordance with the ATRP process, a polymer (pigment dispersant) having an aromatic ring at an end thereof has also been obtained by using an aromatic ring compound (Patent Document 12).

Prior Art Documents
Patent Documents
Patent Document 1: JP-A-38-13530
Patent Document 2: JP-A-41-17063
Patent Document 3: JP-A-39-3980
Patent Document 4: JP-B-49-10690
Patent Document 5: JP-B-60-27697
Patent Document 6: JP-A-2000-500516
Patent Document 7: JP-A-2000-514479
Patent Document 8: JP-A-2000-515181
Patent Document 9: WO 99/05099
Patent Document 10: JP-A-2007-277533
Patent Document 11: JP-A-2006-16488
Patent Document 12: JP-A-2006-167674
Non-patent Documents
Non-patent Document 1: Chemical Review (2001) 101, p3661
Non-patent Document 2: Chemical Review (2001) 101, p3689

Non-patent Document 3: Journal of American Chemical Society (2002) 124 p2874, ibid. (2002) 124 p13666, ibid. (2003) 125 p8720.

DISCLOSURE OF THE INVENTION

Problem to Be Solved by the Invention

However, problems arise in obtaining dye polymers by the above-described conventional processes as will be described next. With the process described in Patent Document 1 and Patent Document 2, for example, a dye monomer can be obtained with relative ease, but a problem is involved in that plural dye groups (dye monomer units) are arranged at random in each molecule of the resulting polymer. This process is a usual radical polymerization process, and therefore, involves another problem in that the molecular weight of the resulting polymer cannot be controlled. Further, the dye monomer is high in molecular weight and is bulky, and therefore, may remain in the polymerization system without undergoing polymerization. In addition, it may be difficult in some instances to introduce only one polymerizable group into each dye molecule. Even if an attempt is made to introduce one polymerizable group (methacryl group), for example, by reacting methacrylic acid chloride with copper tetraminophthalocyanine, a problem arises in that a mixture containing from one not reacted with methacrylic acid chloride to one reacted with four molecules of methacrylic acid chloride is obtained.

With the process described in Patent Documents 3 to 5, the synthesis of a diazo compound as a dye is complex, and the synthesized diazo compound is unstable so that the diazo compound cannot be dried under heat. In the production of a dye polymer by using the diazo compound of the dye, the polymerization conditions are limited depending on the diazo compound of the dye. In the production of the dye polymer that makes use of the diazo compound of the dye, the efficiency of the polymerization initiator may be low, impurities may be formed, and the polymerization degree may be low, in some instances. Moreover, the above-described process is a usual radical polymerization process, and therefore, cannot control the molecular weight of the resulting polymer.

Dye polymers can be obtained by the above-described various living radical polymerization processes. The respective living radical polymerization processes are, however, accompanied by problems as will be described hereinafter. In the NMP process, for example, tetramethylpiperidine oxide radical or the like is used as a polymerization initiator. In this case, an elevated temperature of 100° C. or higher is needed for the polymerization. To achieve a higher polymerization degree, a monomer may be singly subjected to polymerization (bulk polymerization) without using any solvent in some instances. However, stricter polymerization conditions are needed unless a solvent is used. Further, with this process, a methacrylate monomer does not polymerize in general. To lower the polymerization temperature or to make the methacrylate monomer polymerizable, a special nitroxide compound is hence needed as a catalyst. For performing the above-described polymerization, synthesis of the special nitroxide compound is thus needed. It is, therefore, irksome and difficult to introduce a nitroxide group from the compound into the dye.

In the ATRP process, the use of a heavy metal is needed for polymerization, and therefore, the heavy metal is contained in the resulting polymer. Accordingly, purification of the polymer is needed to remove the heavy metal from the polymer even if the heavy metal is contained in a trace amount. When the polymer is purified, effluent water and/or waste solvent occurred by the purification contains the heavy metal that places a high load on the environment, and therefore, removal of the heavy metal is needed. In the ATRP process that makes use of copper, on the other hand, oxygen needs to be eliminated from the polymerization atmosphere. If oxygen is contained in the polymerization atmosphere, cuprous copper is oxidized into cupric copper so that the catalyst is deactivated. To avoid this deactivation, there is a method that adds a stannic compound, ascorbic acid or the like as a reducing agent to reactivate the catalyst. Even with this method, there is a potential problem that the polymerization may terminate halfway due to the deactivation of the catalyst.

In the process that conducts polymerization by forming a metal complex while using an amine compound as a ligand, the existence of an acidic substance in the polymerization system makes it difficult to conduct the polymerization by using an addition-polymerizable monomer containing an acid group because the acidic substance inhibits the formation of the complex. For the introduction of acid groups into the resulting polymer, it is thus necessary to block the acid group of the monomer with a blocking agent, to conduct polymerization, and to eliminate the blocking agent after the polymerization. Therefore, acid groups cannot be introduced with ease into the polymer.

Further, the process described in Patent Document 11 or Patent Document 12 is a process that obtains a polymer in accordance with the ATRP process. According to this process, a copper compound is used as a catalyst so that after the polymerization, a purification step is needed to remove the copper compound from the polymer. Moreover, a monomer having an acid group cannot be polymerized, because the polymerization does not proceed if an acid that inhibits the formation of a complex between a copper compound and a ligand exists in the polymerization system. In addition, the use of an initiator having a sulfonated chloride group as a polymerization initiating group involves problems in that the initiator is hardly available as a dry product and limitations are imposed on the polymerization conditions.

Furthermore, the above-described polymerization reaction in Patent Document 11 or 12 is a polymerization reaction on the surfaces of pigment particles. When an attempt is made to polymerize a monomer on the fine pigment particles, the polymerization has to be conducted while maintaining the particle size of the pigment in a small state, in other words, by stably dispersing the pigment. A difficulty may, however, arise in stably maintaining the dispersed state of the pigment without using any dispersant.

In the RAFT process or MADIX process, it is necessary to synthesize a special compound such as a dithiocarboxylate ester or xanthate compound upon polymerization. However, the introduction of a group of such a compound into a dye is irksome and difficult. When a sulfur-containing compound is used as a polymerization initiator, on the other hand, an unpleasant sulfur smell remains in the resulting polymer. In addition, the polymer is undesirably colored, and therefore, the color needs to be eliminated from the polymer.

The DT process is a process that similar to the ATRP process, makes use of a heavy metal as a catalyst, and depending on the application, the heavy metal needs to be eliminated from the resulting polymer. There is, accordingly, a problem of effluent water that occurs when eliminated. Moreover, the above-described metal catalyst has to be synthesized as needed. However, its synthesis is irksome, and may require high cost. The use of these conventionally-known, living radical polymerization processes for the production of dye polymers, therefore, requires to solve the above-described problems and to readily introduce initiating groups into dyes.

As dyes which are soluble in solvents, there are "so-called" dyes. These so-called dyes are, however, accompanied by problems in that they foul up places of handling due to scattering or the like; that they are low-molecular compounds and, when used for coloring products or articles, bleed out or migrate to or penetrate into other products or articles; and that they are poor in waterproofness and solvent resistance, and therefore, are extracted with water and organic solvents.

In the market, on the other hand, keeping in step with the move toward products of still higher performance, high performance is also required for colorants such as pigments and coloring agents. There is hence an outstanding demand for novel coloring agents, novel binders for coloring agents, and novel pigment dispersants. More specifically, there is an outstanding demand for colorants, which have high color-developing ability, are vivid and are high in various durability and transparency. As pigment dispersants, there is an outstanding demand for those which are excellent in various properties such as pigment dispersibility, the storage stability of dispersed pigment particles, and transparency. Especially with pigment dispersions, there is a current tendency that pigments are microparticulated to 100 nm or smaller to provide colored products or articles with improved transparency. When a pigment is formed into microparticles, the pigment is provided with higher surface energy. As a result, the pigment particles undergo coagulation. Accordingly, the pigment dispersion is poor in storage stability, and tends to increase in viscosity. There is, hence, an outstanding demand for a pigment dispersant, which is effective for providing a pigment with improved dispersibility and a dispersion with lowered viscosity.

Means for Solving the Problem

To solve the above-described various problems, the present inventors have enthusiastically conducted research, and as a result, have achieved the present invention.

Described specifically, the present invention provides a production process of a dye polymer having a dye content of from 1 to 50 wt %, which comprises subjecting an addition-polymerizable monomer to living radical polymerization by using, as a polymerization initiator, a dye having a polymerization initiating group enabling the living radical polymerization.

The present invention also provides a production process of a dye polymer having a dye content of from 1 to 50 wt %, which comprises subjecting an addition-polymerizable monomer to living radical polymerization by using, as a polymerization initiator, a dye raw compound having a polymerization initiating group enabling the living radical polymerization, such that the dye raw compound is converted into a dye.

In the present invention as described above, the polymerization initiating group may preferably be a group of the following formula (1):

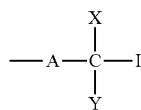

(1)

wherein X and Y may be the same or different and each represent a hydrogen atom, hydrocarbon group, halogen atom, cyano group, alkoxycarbonyl group, allyloxycarbonyl group, acyloxy group, allyloxy group, alkoxy group, alkylcarbonyl group or allylcarbonyl group, and A represents a connecting group to the dye or dye raw compound; and the living radical polymerization is conducted in the presence of a catalyst (phosphorus compound, nitrogen compound or oxygen compound) that extracts the iodine atom from the group of the formula (1) to generate a radical. Preferably, the dye or dye raw compound having the group of the formula (1) may have been produced by halogen exchange from a dye or dye raw material having a group of the formula (1) in which I (iodine) is bromine or chlorine.

In the present invention as described above, the dye may preferably be an azo, cyanine, phthalocyanine, perylene, perinone, diketopyrrolopyrrole, quinacridone, isoindolinone, isoindoline, azomethine, dioxazine, quinophthalone, anthraquinone, indigo, azo-metal complex, quinoline, diphenylmethane, triphenylmethane, xanthene, Lumogen, coumarin, fluorescein or fluorescent dye, and the dye raw compound may preferably be a raw compound for the dye.

In the present invention as described above, the phosphorus compound as the catalyst may preferably be an iodine-containing phosphorus halide, phosphite compound or phosphinate compound, the nitrogen compound as the catalyst may preferably be an imide compound, and the oxygen compound as the catalyst may preferably be a phenol compound, iodoxyphenyl compound or vitamin. A polymer bonded to the dye may preferably be a homopolymer, random copolymer, block copolymer or gradient copolymer, a number average molecular weight of which may preferably be from 1,000 to 50,000.

In the present invention as described above, the addition-polymerizable monomer may preferably have a carboxyl group, sulfonic group or phosphoric group, and the resultant dye polymer may preferably be neutralized with an alkaline substance to provide the dye polymer with water solubility.

The present invention also provides a dye polymer obtained by the above-described production process of the present invention; a pigment composition comprising the above-described dye polymer and a pigment; and a coloring agent comprising the above-described dye polymer or the above-described pigment composition.

Advantageous Effects of the Invention

According to the present invention, a dye polymer can be readily provided by a living radical polymerization process different from the conventional radical polymerization processes and the above-described living radical polymerization processes. The dye polymer and a pigment composition (composite pigment), which contains the dye polymer and a pigment, are useful as coloring agents for various applications, and moreover, the dye polymer of the present invention is also used as a pigment dispersant and as a colored binder.

The production process of the present invention for the dye polymer uses no heavy metal compound, and therefore, does not necessarily require a purification step which would otherwise be needed to eliminate a heavy metal. The process of the present invention does not require the synthesis of a special compound such as a catalyst, and the polymerization can be easily practiced only with materials which are readily available from the market and are relatively economical. The polymerization in the process of the present invention can be carried out under mild conditions, and can be conducted under similar conditions as in the conventional radical polymerization processes. The process of the present invention does not require any special apparatus, and a conventional radical polymerization apparatus can be used as it is. Even if oxygen, water or light exists in the polymerization atmosphere, it does not affect the polymerization much. The monomer, solvent and the like, which are to be used in the present invention, do not require purification. Monomers having various functional groups such as an acid group, amino group and epoxy group, respectively, can be used, thereby making it possible to introduce such various functional groups onto polymer chains. The molecular weight of the polymer to be bonded to the dye is controllable, and polymers of various higher-order structures such as block structures and gradient structures can be obtained. Further, the polymerization degree is also excellent.

The dye polymer obtainable in the present invention is a dye polymer that an initiating group is introduced into a dye, polymerization is initiated from this initiating group, and the resulting polymer is covalently bonded to the dye. In the present invention, a dye polymer with a dye molecule bonded to an end of each polymer chain can be obtained, and by introducing plural initiating groups onto each dye molecule and then conducting polymerization, a dye polymer with plural polymer chains bonded on each dye molecule can also be obtained.

Even if a dye to be used as a raw material is soluble in neither organic solvents nor water, the bonding of a polymer to the dye makes it possible to provide the polymer-bonded dye with high solubility, dispersibility or emulsifiability in various organic solvents and water owing to the solubility of the polymer. Moreover, the dye polymer according to the present invention contains the heat-meltable polymer components, and therefore, can be melt-kneaded in a thermoplastic resin. In this case, the dye polymer has a large molecular weight, and hence, does not bleed out from moldings or does not undergo migration to or penetration into other products or articles.

The dye polymer according to the present invention can be combined with a pigment into a composition. As methods for forming such a composition, the following methods can be mentioned: (1) to produce the pigment in the presence of the dye polymer, (2) to synthesize the pigment by using a dye raw polymer (claim 2) as a part of a raw material, (3) to add the dye polymer to a crude pigment and then to form (microparticulate or knead) the crude pigment into the pigment, and (4) to disperse the pigment in a medium and then to allow the dye polymer to deposit on the surfaces of pigment particles such that a pigment composition (composite pigment) with the pigment and dye polymer combined together is obtained. By such a method, it is possible to control the particle size and shape of the pigment and also to modify the pigment at surfaces thereof with the dye polymer. As the polymer component in the composite pigment formed of the pigment and dye polymer is soluble in a solvent, the pigment can be provided as a readily-dispersible pigment that can be dispersed with ease in the solvent.

As has been described above, the dye polymer according to the present invention and the composition according to the present invention, said composition being formed of the dye polymer and the pigment, are useful as good coloring agents for various products or articles. The colored products or articles are high in transparency, and are provided with high added value. Further, the dye polymer according to the present invention can be used as a dispersant for pigments, and can afford pigment dispersions excellent in dispersion properties and dispersion stability.

MODES FOR CARRYING OUT THE INVENTION

The present invention will hereinafter be described in further detail based on preferred embodiments of the present invention.

The polymerization process for use in the present invention is a novel living radical polymerization process. This living radical polymerization process can be readily practiced by a conventional radical polymerization method except for the use of a dye having an initiating group and a catalyst. Different from the conventional living radical polymerization process, there is no need to use special compound or compounds such as a metal compound and ligand, a nitroxide, a dithiocarboxylate ester or a xanthate compound.

The living radical polymerization process for use in the present invention proceeds through a reaction mechanism represented by the following reaction formula (I), and is a reversible activation reaction of a dormant species, Polymer-X (P–X), into a propagating radical.

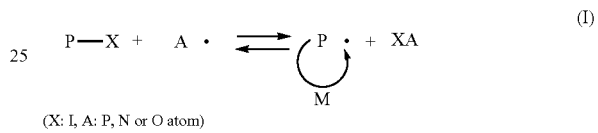

(X: I, A: P, N or O atom)

Although the above-described polymerization mechanism may vary depending on the kind of a catalyst to be used, the polymerization mechanism is considered to proceed as will be described next.

In the reaction formula (I), a free radical generated from a radical polymerization initiator reacts to XA as a catalyst to form a catalyst A• in situ. A• acts as an activator for P–X, and owing to its catalytic effect, P–X is activated at high frequency.

Described more specifically, a free radical is generated from the radical polymerization initiator in the presence of a dye containing an initiating group with iodine (X) bonded thereto as represented by the formula (1). The thus-generated free radical extracts an active hydrogen or active halogen atom from the catalyst to form a catalyst radical A•. This A• then extracts X from the initiating group in the initiating-group-containing dye to form XA. The initiating group from which X has been extracted is in the form of a radical. A monomer undergoes addition polymerization with the radical, so that X is immediately extracted from XA to prevent any polymerization termination reaction. Under heat or the like, A• extracts X from the end X to form XA and an end radical. This end radical then reacts to the monomer, and X is immediately given to the end radical so that the end radical is stabilized.

Through repetition of the above-described reaction, the polymerization proceeds to produce a polymer while permitting control of the molecular weight and structure of the polymer. According to this polymerization process, a bimolecular termination reaction that end radicals of polymer chains may couple to each other may take place in some instances.

A description will next be made about the initiating-group-containing dye for use in the present invention. It is to be noted that the term "dye" as used herein means an "organic dye".

The initiating-group-containing dye for use in the present invention has a group of the following formula (1):

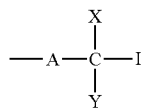

wherein X, Y and A have the same meanings as defined above.

The dye polymer according to the present invention can be obtained by the novel living radical polymerization that subjects an addition-polymerizable monomer to addition polymerization with the initiating-group-containing dye in the presence of a catalyst and a radical polymerization initiator. The use of a dye raw compound having an initiating group of the formula (1) in place of the above-described initiating-group-containing dye makes it possible to obtain a dye raw polymer. By reacting the dye raw polymer with one of various compounds to make it develop a color, the dye polymer according to the present invention can be obtained. It is to be noted that the term "dye raw compound" may hereinafter be encompassed in the term "dye" in the present invention.

X and Y in the formula (1) will now be specifically exemplified, although the present invention shall not be limited to such specific examples. Examples of the hydrocarbon group include alkyl, alkenyl, alkynyl, aryl, and arylalkyl groups. Specific examples include alkyl groups such as methyl, ethyl, propyl, isopropyl, butyl, isobutyl, 2-methylpropyl, t-butyl, pentyl and dodecyl; alkenyl groups containing a double bond, such as vinyl, allyl, 2-methylvinyl, butenyl and butadienyl; alkynyl groups containing a triple bond, such as acetylenyl and methylacetynyl; aryl groups, such as phenyl, naphthyl, methylphenyl, ethylphenyl, propylphenyl, dodecylphenyl and biphenyl, and including heterocyclic groups such as pyridinyl and imidazolinyl; arylalkyl groups such as phenylmethyl, 1-phenylethyl, 2-phenylethyl and 2-phenylpropyl; and the like.

Examples of the halogen atom include fluorine, chlorine, bromine and iodine atoms; examples of the alkoxycarbonyl group and allyloxycarbonyl group include methoxycarbonyl, ethoxycarbonyl, propylcarbonyl, cyclohexylcarbonyl, benzyloxycarbonyl, phenoxycarbonyl and naphthoxycarbonyl; examples of the acyloxy group and allyloxy group include acetoxy, ethylcarbonyloxy, cyclohexylcarbonyloxy, benzoyloxy and naphthylcarboxyloxy; examples of the alkoxy group include methoxy, ethoxy, methoxyethoxy and phenoxyethoxy; and examples of the alkylcarbonyl group and allylcarbonyl group include methylcarbonyl, ethylcarbonyl and phenylcarbonyl.

Specific examples of the initiating group of the formula (1) include, but are not limited to, iodomethyl, iodomethylmethyl, iodoethylmethyl, iodopropylmethyl, iodoisopropylmethyl, iodobutylmethyl, iodoisobutylmethyl, iodopentylmethyl, iodododimethylmethyl, iodomethylethylmethyl, iodopropylmethylmethyl, iodophenylmethyl, iodophenylmethylmethyl, iodophenylethylmethyl, iododiphenylmethyl, iododichloromethyl, iododibromomethyl, triiodomethyl, iodocyanomethyl, iodocyanomethylmethyl, iodo(methoxycarbonyl)methyl, iodo(methoxycarbonyl)methylmethyl, iodoacetoxymethyl, iodomethylacetoxymethyl, iodomethoxymethylmethyl, iodomethylcarbonylmethylmethyl, and the like Especially as preferred initiating groups that can be readily introduced into dyes, illustrative are iodomethyl, iodomethylmethyl, iododimethylmethyl, iodoethylmethyl, iodopropylmethyl, iodoisopropylmethyl, iodobutylmethyl, iodoisobutylmethyl, iodopentylmethyl, iodopropylmethylmethyl, iodophenylmethyl, iodophenylmethylmethyl, iododihalogenomethyl, and the like.

Next, A in the formula (1) is a desired connecting group, and may be omitted. In this case, the initiating group is introduced into the dye without any connecting group. Specific examples of the connecting group include hydrocarbon groups such as alkylene, alkynylene, vinylene, phenylene, naphthylene and phenylenealkylene; ester groups, amide groups, ketone groups, ether groups and urethane groups; groups formed by coupling the above-described hydrocarbon groups via ester groups, amide groups, ketone groups, ether groups or urethane groups; and the like. In particular, those which contain, as A, an ester or amide group or an ester or amide groups via a hydrocarbon group are preferred as they can be readily synthesized.

Using the dye having the initiating group of the formula (1), the dye polymer according to the present invention can be obtained. The dye polymer according to the present invention can also be obtained by using a dye having an initiating group of the following formula (2):

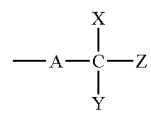

wherein Z is a fluorine atom, chlorine atom or bromine atom, and X, Y and A have the same meanings as in the formula (1).

When the compound of the formula (2) is used, it is preferred to react the compound, preferably chloride or bromide of the formula (2) with iodine or an iodine compound such as a quaternary ammonium iodide compound, an alkali metal iodide or an alkaline earth metal iodide to conduct halogen exchange and to use the resulting compound as a dye containing an initiating group of the formula (1).

The iodine compound, which has the group of the formula (1) and is useful in the present invention, is known to be unstable under light or heat, while the compound having the group of the formula (2) is high in stability even during its synthesis, storage, drying and the like. Moreover, the compound having the group of the formula (2) is available as a chloride or bromide from the market. It is, therefore, preferred to synthesize the stable compound having the group of the formula (2) and to use the same in the present invention rather than the iodide having the group of the formula (1). Accordingly, it is preferred to substitute the halogen atom in the compound, which has the group of the formula (2), with an iodine atom shortly before the initiation of polymerization and then to use the resulting iodide.

Examples of the compound having the group of the formula (2) include compounds in which the iodine atom in the group of the formula (1) has been substituted by halogen atoms such as chlorine atom and bromine atoms, respectively. As the substituent group of the formula (2), one containing a bromine atom as Z is particularly preferred in that it can be easily introduced into the dye.

The above-described halogen exchange reaction of the chlorine atom or bromine atom with the iodine atom is conventionally known. Although not particularly limited, the halogen exchange reaction can be conducted, preferably at from 30 to 120° C., more preferably at from 50 to 100° C. in a solvent. Iodine compounds usable in the iodine exchange include iodine; quaternary ammonium salts such as tetramethylammonium iodide, tetraethylammonium iodide and benzyltrimethylammonium iodide; alkali metal iodides such as lithium iodide, sodium iodide and potassium iodide; and alkaline earth metal iodides such as magnesium iodide, strontium iodide, calcium iodide and barium iodide.

Preferred iodine compounds for use in the iodine exchange are alkali metal iodides and quaternary ammonium iodides. The alkali metal iodides are preferred, because they are easily soluble in organic solvents, especially in polar solvents such as dimethylacetamide, dimethyl sulfoxide and N-methylpyrrolidone, alkali metal bromides or alkali metal chlorides formed through halogen exchange do not dissolve in the solvents but precipitate there, and therefore, the iodine exchange reactions are allowed to proceed in a direction that iodine is exchanged. The use of the quaternary ammonium iodides is also preferred for similar reasons as described above, as they are soluble inorganic solvents. Each dye obtained through such an iodine exchange reaction and having an initiating group of the formula (1) does not require isolation, and can be used, as it is, in living radical polymerization without isolation.

When a dye has a group of the formula (1) or formula (2), a dye polymer according to the present invention can be obtained by using the group in the dye. Even if a dye does not have any group of the formula (1) or formula (2), the dye can be still used by reacting, with a reactive group such as a hydroxyl, carboxyl, amino, isocyanate or glycidyl group, said reactive group being contained in the dye, a compound (a) having a group which can react with the group of the formula (1) or formula (2) and the reactive group.

A compound having a group of the formula (1) or formula (2) can be obtained, for example, by a method that a compound (a) having a functional group such as a hydroxyl, amino or glycidyl group is reacted with a dye when the dye has a carboxyl group, a method that a compound (a) having a functional group such as a carboxyl group or its anhydride or halide or a glycidyl group is reacted with a dye when the functional group of the dye is an amino group, a method that a compound (a) having a functional group such as a carboxyl group or its anhydride or halide, an isocyanate group or a glycidyl group is reacted with a dye when the functional group of the dye is a hydroxyl group, or a method that a compound (a) having a functional group such as a carboxyl or amino group is reacted with a dye when the functional group of the dye is a glycidyl group.

In the present invention, it is particularly preferred to obtain a dye having a group of the formula (1) or formula (2) by using a dye, which has a hydroxyl group, a carboxyl group or its derivative, or an amino group, and reacting the dye with a compound (a) having a group (a carboxyl group or its derivative, or a hydroxyl group), which can react with the functional group, and also a group of the formula (1) or formula (2). In the above-described case, the dye and the initiating group are bonded together via an ester group or amide group. It is to be noted that the term "its derivative (i.e., a derivative of a carboxyl group)" means a hydride, halide (such as chloride or bromide), or lower alcohol (carbon number: 1 to 20, preferably 1 to 8) ester of a carboxyl group.

An acid of the following formula (3) or a derivative thereof or an alcohol of the following formula (4) can be reacted with a dye having a hydroxyl group, a carboxyl group or its derivative, or an amino group to produce a dye having a group of the formula (2):

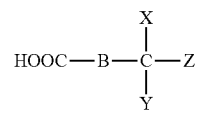

(3)

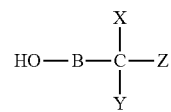

(4)

wherein Z, X and Y have the same meanings as defined above, and B is a desired connecting group.

A compound having a group of the formula (2) can be obtained by a method that a compound of the formula (3) or its derivative is reacted when the reactive group of the dye is a hydroxyl group, a method that a compound of the formula (4) is reacted when the reactive group of the dye is a carboxyl group, or a method that a compound of the formula (3) or its derivative is reacted when the reactive group of the dye is an amino group. When the compounds of the formula (3) have a free carboxyl group, the reactions are dehydration reactions. These reactions are dealcoholation reactions when the carboxyl groups are their lower ester derivatives, are dehydrohalogenation reactions when the carboxyl groups are their halide derivatives, and are addition reactions to conduct esterification or amidation when the carboxyl groups are their anhydride derivatives.

Examples of the compound of the formula (3) or its derivative as the compound (a) include chloroaceticacid, α-chloropropionic acid, α-chlorobutyric acid, α-chloroisobutyric acid, α-chlorovaleric acid, α-chloroisovaleric acid, α-chlorocaproic acid, α-chlorophenylacetic acid, α-chlorodiphenylacetic acid, α-chloro-α-phenylpropionic acid, α-chloro-β-phenylpropionic acid, bromoacetic acid, α-bromopropionic acid, α-bromobutyric acid, α-bromoisobutyric acid, α-bromovaleric acid, α-bromoisovaleric acid, α-bromocaproic acid, α-bromophenylaceticacid, α-bromodiphenylaceticacid, α-bromo-α-phenylpropionic acid, α-bromo-β-phenylpropionic acid, iodoacetic acid, α-iodopropionic acid, α-iodobutyric acid, α-iodoisobutyric acid, α-iodovaleric acid, α-iodoisovaleric acid, α-iodocaproic acid, α-iodophenylacetic acid, α-iododiphenylacetic acid, α-iodo-α-phenylpropionic acid, α-iodo-β-phenylpropionic acid, β-chlorobutyric acid, β-bromoisobutyric acid, iododimethylmethylbenzoic acid, 1-chloroethylbenzoic acid, and the like. Examples of its derivative include the chlorides and bromides of these acids, the anhydrides of these acids, and their lower esterification products with alcohols having from 1 to 20 carbon atoms, preferably from 1 to 8 carbon atoms.

Examples of the alcohol of the formula (4) as the compound (a) include 1-chloroethanol, 1-bromoethanol, 1-iodoethanol, 1-chloropropanol, 2-bromopropanol, 2-chloro-2-propanol, 2-bromo-2-methylpropanol, 2-phenyl-1-bromoethanol, 2-phenyl-2-iodoethanol, and the like. These examples may also include compounds, each of which has a group of the formula (2) and an end hydroxyl group and has been obtained by reacting the carboxyl group of the corresponding compound of the formula (3) or its derivative with a hydroxyl group at one end of a diol such as ethylene glycol, propylene glycol or butanediol, or a polyglycol thereof.

The reaction between the dye having a hydroxyl group, a carboxyl group or its derivative, or an amino group and the compound of the formula (3) or (4) can be conducted by a conventionally-known method, and no particular limitation is imposed thereon. When the above-described reaction is dehydration condensation or dealcoholation condensation, for example, the reaction can be conducted preferably at from 50 to 250° C., more preferably at from 80 to 200° C. An azeotropic solvent and a catalyst such as paratoluenesulfonic acid or tetrabutyl titanate may be added as needed. Further, the reaction system may be depressurized as needed. When the carboxyl group is its anhydride derivative or halide derivative, a hydrohalogenation reaction is conducted preferably at from −20° C. to 100° C., more preferably at from −5° C. to 50° C. A base such as triethylamine or pyridine may be added as needed. In the case of a free carboxyl group, an esterification or amidation reaction is conducted by using dicyclohexylcarbodiimide as a dehydration condensation agent.

A description will next be made about the dye (and dye raw compound) for use in the present invention. The dye for use in the present invention is an organic dye. Illustrative are dyes and fluorescent dyes, which are useful as pigments or so-called dyes and have an azo, cyanine, phthalocyanine, perylene, perinone, diketopyrrolopyrrole, quinacridone, isoindolinone, isoindoline, azomethine, dioxazine, quinophthalone, anthraquinone, indigo, azo-metal complex, quinoline, diphenylmethane, triphenylmethane, xanthene, Lumogen, coumarin or fluorescein skeleton. No particular limitation is imposed insofar as the dye has one of these structure.

Specifically classified by structures, examples of the azo dye include soluble monoazo pigments, insoluble monoazo pigments, disazo pigments, and polyazo pigments as condensed azo pigments. The soluble monoazo pigments include PR (C.I. Pigment Red)-48, PR-49, PR-50, PR-51, PR-52, PR-53, PR-57, PR-58, PR-60, PR-63, PR-64, PO(C.I. Pigment Orange)-17, PO-18, PY(C.I. Pigment Yellow)-61, PY-62, and the like, and also include their laked products such as their sodium salts, barium salts, strontium salts and calcium salts. In particular, these soluble monoazo pigments are usable even in the forms of those (dyes) having structures not laked with metals.

The insoluble monoazo, disazo and condensed azo pigments include PR-1, PR-2, PR-3, PR-5, PR-21, PR-38, PR-41, PR-112, PR-114, PR-144, PR-146, PR-150, PR-166, PR-170, PR-185, PR-187, PR-214, PR-242, PO-5, PO-13, PO-16, PO-34, PO-36, PBr (C.I. Pigment Brown)-25, PY-1, PY-3, PY-10, PY-12, PY-13, PY-14, PY-17, PY-55, PY-74, PY-81, PY-83, PY-93, PY-94, PY-95, PY-97, PY-154, PY-166, PY-167, PY-180, and the like.

Examples of the cyanine dye, in other words, polymethine dye include species such as cyanine dyes, merocyanine dyes and squarylium dyes. Specifically exemplified, there can be mentioned, as common names, DEOPC, DEOTC, IR-125, IR-144, Styryl-6, Styryl-9, and the like. Examples of the phthalocyanine dye include copper phthalocyanines such as PB (C.I. Pigment Blue)-15, PB-15:1, PB-15:2, PB-15:3, PB-15:4, PB-15:5, PB-15:6, PB-17:1, PG (C.I. Pigment Green)-7, PG-36 and PB-37, metal-free phthalocyanines such as PB-16, and further, those containing different center metals, such as zinc phthalocyanine, zinc chlorophthalocyanine, aluminum phthalocyanine, manganese phthalocyanine, tin phthalocyanine, vanadium phthalocyanine, titanium phthalocyanine, boron subphthalocyanines complexes and uranium superphthalocyanine complexes.

Examples of the perylene dye include PR-123, PR-149, PR-178, PR-179, PR-190, PR-224, PV (C.I. Pigment Violet)-29, PBk (C.I. Pigment Black)-31, PBk-32, and the like. Examples of the perinone dye include PO-43, PR-194, and the like. Examples of the diketopyrrolopyrrole dye include PR-254, PR-255, PR-264, PR-270, PR-272, PO-71, PO-73, and the like. Examples of the quinacridone dye include PV-19, PR-122, PR-202, PR-206, PR-207, PR-209, PO-48, and the like. Examples of the isoindoline dye include PY-139, PY-185, PO-66, PO-69, PR-260, and the like. Examples of the isoindolinone dye include PY-109, PY-110, PY-173, PO-61 and the like.

Examples of the azomethine dye include PY-129 and the like. Examples of the dioxazine dye include PY-23, PV-37, and the like. Examples of the quinophthalone dye include PY-138 and the like. Examples of the anthraquinone dye include PY-23, PY-108, PO-51, PR-168, PR-177, PB-60, alizarin red, and the like. Examples of the indigo dye include thioindigo dyes, e.g., PB-66, PB-63, PR-88, PR-181, PBr-27, indigo carmine, and the like. Examples of the azo-metal complex dye include PG-8, PG-10, PY-129, PY-150, PY-153, PY-65, PO-68, PR-257, and the like.

In addition, so-called dyes can also be used including, for example, quinoline dyes such as quinoline yellow; diphenylmethane dyes such as auramine; triphenylmethane dyes such as methyl violet, crystal violet and diamond green; xanthene dyes such as rhodamine 6G, rhodamine, rhodamine B, rhodamine 3B, eosin red, eosin G, basic yellow HG, brilliant sulfoflavin FF, and alkali blues such as PB-18, PB-19, PB-56, PB-57, PB-61, PB-56:1 and PB-61:1; Lumogen dyes such as Lumogen L yellow and Lumogen L brilliant yellow; and coumarin dyes such as coumarin 110, coumarin 153, coumarin 480, coumarin 6H, coumarin 6, coumarin and dihydroxymethylcoumarin.

Also included are fluorescein dyes and other fluorescent dyes. Examples of these dyes include those having the acridine skeleton, carbazole skeleton, pyrene skeleton or the like. Described specifically, the fluorescein dyes include, but are not specifically limited to:

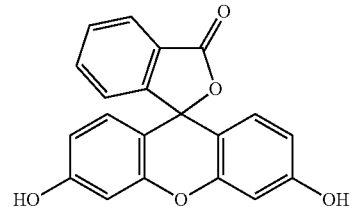

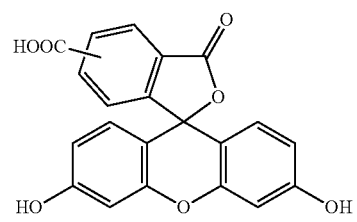

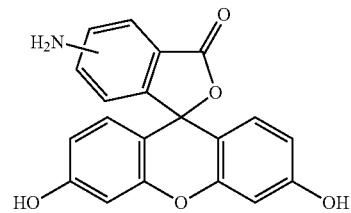

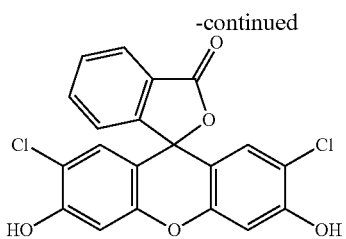

and, the acridine dyes include, but are not specifically limited to:

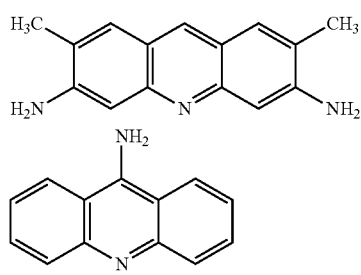

The carbazole dyes include, but are not specifically limited to:

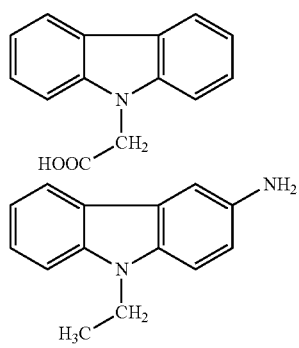

and, the pyrene dyes include, but are not specifically limited to:

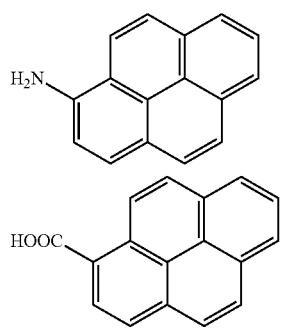

Dye polymers according to the present invention can also be obtained by introducing the above-described initiating groups into these dye raw compounds, subjecting the resulting compounds to living radical polymerization to obtain dye raw polymers as described above, and then reacting color-developing materials in the polymers. The above-described dye raw compounds are raw materials for pigments, so-called dyes and so-called fluorescent dyes, and no particular limitation is imposed thereon.

Describing specific examples, illustrative raw compounds for azo dyes include, as coupling components, β-naphthols, β-oxynaphthoic acids, naphthol AS and derivatives thereof, acetoaceticallylide, pyrazolones, benzimidazolone-containing acetoacetic allylides and the like, and as diazo components, aniline, methylaniline, dichloroaniline, nitroaniline and the like; illustrative raw compounds for phthalocyanine dyes include phthalodinitrile, phthalic anhydride, phthalimide and the like; illustrative raw compounds for anthraquinone dyes include aminoanthraquinones, aminonaphthalenes and the like; and illustrative raw compounds for quinacridone dyes include p-xylene, benzoquinone, hydroquinone, anthranilic acid, aniline, dimethylsuccinic acid and the like.

Illustrative raw compounds for indigo dyes include aniline, anthranilic acids, benzene sulfochloride, thiophenol, diphenyl sulfide, benzene ethyl dithiocarbonate, and the like; and illustrative raw compounds for dioxazine dyes include aminoethylcarbazole, tetrachlorobenzoquinone, aminoethoxybenzene phenylamide, dichlorodi(methylamido)benzoquinone, and the like.

Illustrative raw compounds for perylene dyes include perylenetetracarboxylic anhydride, acetonaphthene, naphthalic anhydride, naphthalic acid imide, perylenetetracarboxylic acid imide, and the like; illustrative raw compounds for perynone dyes include acenaphthene, naphthalenetetracarboxylic acids, and the like; illustrative raw compounds for isoindoline dyes include tetrachlorophthalimide, diaminobenzene, 2-cyanotetrachlorobenzoic acid, and the like; illustrative raw compounds for isoindoline dyes include phthalodinitrile, aminoiminoisoindoline, diiminoisoindolinone, cyanoacetanilide, and the like; illustrative raw compounds for metal-complex dyes include dihydroxyquinoline, aminoisoindoline, aminobenzimidazole, and the like; illustrative raw compounds for quinophthalone dyes include phthalic anhydride, chinaldine, and the like; illustrative raw compounds for diketopyrrolopyrrole dyes include succinate esters, benzonitriles, and the like; and illustrative raw compounds for xanthate dyes include resorcinol, thymol, phthalic anhydride, and the like.

The above-described dyes or their raw materials can be used in the present invention. However, the present invention is not limited specifically to those described herein, and can also use those having structures not described herein.

In the present invention, an initiating group is introduced into each of these dyes (or dye raw compounds) by using a compound to which the above-described reactive group, that is, a hydroxyl group, a carboxyl group or its derivative, or an amino group is bonded. A dye with the reactive group bonded to itself can be used as it is. Even in the case of a dye which does not have such a reactive group, the above-described functional group can be introduced into the dye by a conventionally-known method. No particular limitation is imposed on the introduction method. However, when it is desired to introduce, for example, an amino group, the amino group can be obtained by nitrating a dye and then reducing the resultant nitro group, both by conventionally-known methods; or when it is desired to introduce a methylol group, the methylol group can be formed by oxidizing a methyl group into a carboxyl group and reducing the carboxyl group; or as an alternative, the methylol group can be introduced by substituting formaldehyde onto a benzene ring or the like.

A description will next be made about the catalyst for use in the living radical polymerization in the present invention. Usable as the catalyst is a compound that as illustrated by the above-described reaction formula (I), can be converted into a radical capable of extracting an iodine atom from an initiating group or an iodine atom from an end of a polymer. Especially in the present invention, a phosphorus-containing compound, nitrogen-containing compound or oxygen-containing compound having the above-described property is preferred.

Examples of the phosphorus-containing compound include iodine-containing phosphorus halides, phosphite compounds and phosphinate compounds; examples of the nitrogen-containing compound include imide compounds; and examples of the oxygen-containing compound include phenolic compounds, iodoxyphenyl compounds and vitamins. No particular limitation is imposed on the phosphorus-containing compound and nitrogen-containing compound and oxygen-containing compound, insofar as they are the above-exemplified compounds.

Specifically exemplified, illustrative of the phosphorus-containing compound are iodine-containing phosphorus halides, phosphite compounds and phosphinate compounds, for example, dichloroiodophosphorus, dibromoiodophosphorus, phosphorus triiodide, dimethyl phosphite, diethyl phosphite, dibutyl phosphite, diperfluoroethyl phosphinate, diphenyl phosphite, dibenzyl phosphite, bis(2-ethylhexyl) phosphite, bis(2,2,2-trifluoroethyl)phosphite, diallyl phosphite, ethylene phosphite, ethoxyphenyl phosphinate, phenylphenoxy phosphinate, ethoxymethyl phosphinate, phenoxymethyl phosphinate, and the like.

Illustrative of the nitrogen-containing compound are imide compounds, for example, succinimide, 2,2-dimethylsuccinimide, α,α-dimethyl-β-methylsuccinimide, 3-ethyl-3-methyl-2,5-pyrrolidinedione, cis-1,2,3,6-tetrahydrophthalimide, α-methyl-α-propylsuccinimide, 5-methylhexahydroisoindol-1,3-dione, 2-phenylsuccinimide, α-methyl-α-phenylsuccinimide, 2,3-diacetoxysuccinimide, maleimide, phthalimide, 4-methylphthalimide, N-chlorophthalimide, N-bromophthalimide, N-iodophthalimide, 4-nitrophthalimide, 2,3-naphthalenecarboximide, pyromellitic diimide, 5-bromoisoindol-1,3-dione, N-chlorosuccinimide, N-bromosuccinimide, N-iodosuccinimide, and the like.

Illustrative of the oxygen-containing compound are phenolic compounds each having a phenolic hydroxyl group which is a hydroxyl group bonded to an aromatic ring, iodoxyphenyl compounds as iodides of phenolic hydroxyl groups, and vitamins. The phenolic compounds include phenol, hydroquinone, methoxyhydroquinone, t-butylphenol, t-butylmethylphenol, catechol, resorcin, di-t-butylhydroxytoluene, dimethylphenol, trimethylphenol, di(t-butyl)methoxyphenol, polymer obtained by polymerizing hydroxystyrene, and hydroxyphenyl-carrying microparticles of the polymer. As these compounds are incorporated as polymerization inhibitors for the preservation of monomers, catalytic effects are also exhibited by using commercially-available monomers as they are without purification. The iodoxyphenyl compounds include thymol iodide and the like, and the vitamins include vitamin C, vitamin E and the like. One or more of these compounds can be used as the catalyst, and the catalyst is not limited to these specific examples.

A description will next be made about the addition-polymerizable monomer for use in the present invention. No particular limitation is imposed on the addition-polymerizable monomer in the present invention, and therefore, conventionally-known addition-polymerizable monomers can be used. Especially in the present invention, monomers having a functional group such as a carboxyl, glycidyl, amino, isocyanate or hydroxyl group can be used with ease. By using desired one of these monomers, corresponding functional groups can be introduced into the dye polymer.

Exemplifying the addition-polymerizable monomer, there can be mentioned, for example, vinyl monomers such as styrene, vinyltoluene, vinylhydroxybenzene, chloromethylstyrene, vinylnaphthalene, vinylbiphenyl, vinylethylbenzene, vinyldimethylbenzene, α-methylstyrene, ethylene, propylene, isoprene, butene, butadiene, 1-hexene, cyclohexene, cyclodecene, dichloroethylene, chloroethylene, fluoroethylene, tetrafluoroethylene, acrylonitrile, methacrylonitrile, vinyl acetate, vinyl propionate, vinylethyl alkylcarbonyl group, allylcarbonyl group, isocyanatodimethylmethane isopropenyl benzene, phenylmaleimide, cyclohexylmaleimide, and hydroxymethylstyrene;

aliphatic, alicyclic and aromatic alkyl (meth)acrylates such as methyl(meth)acrylate, ethyl (meth)acrylate, propyl(meth)acrylate, isopropyl (meth)acrylate, butyl(meth)acrylate, 2-methylpropane (meth)acrylate, t-butyl(meth)acrylate, pentyl (meth)acrylate, hexyl(meth)acrylate, octyl (meth)acrylate, 2-ethylhexyl(meth)acrylate, nonyl (meth)acrylate, decyl (meth)acrylate, isodecyl (meth)acrylate, lauryl(meth)acrylate, tetradecyl (meth)acrylate, octadecyl(meth)acrylate, behenyl (meth)acrylate, isostearyl(meth)acrylate, cyclohexyl (meth)acrylate, t-butylcyclohexylmethyl (meth)acrylate, isoboronyl(meth)acrylate, trimethylcyclohexyl(meth)acrylate, cyclodecyl (meth)acrylate, cyclodecylmethyl(meth)acrylate, benzyl(meth)acrylate, t-butylbenzotriazolephenylethyl(meth)acrylate, phenyl(meth)acrylate, naphthyl(meth)acrylate, and allyl(meth)acrylate;

as monomers containing one or more hydroxyl groups, alkylene glycol mono(meth)acrylates such as 2-hydroxyethyl (meth)acrylate, 2-hydroxypropyl (meth)acrylate, 3-hydroxypropyl(meth)acrylate, 4-hydroxybutyl(meth)acrylate, 6-hydroxyhexyl (meth)acrylate, cyclohexanedimethanol mono (meth)acrylate, and cyclohexanediol mono(meth)acrylate;

as monomers having one or more glycol groups, polyalkylene glycol mono(meth)acrylates such as poly(n≧2)ethylene glycol mono(meth)acrylate, poly(n≧2)propylene glycol mono(meth)acrylate, poly(n≧2)tetramethylene glycol mono (meth)acrylate, the mono(meth)acrylate of a mono- or poly (n≧2) ethylene glycol-mono- or poly(n≧2)propylene glycol random copolymer, and the mono(meth)acrylate of a mono- or poly(n≧2)ethylene glycol-mono- or poly(n≧2)propylene glycol block copolymer;

further, the mono(meth)acrylates of (polyalkylene)glycol monoalkyl, alkylene, alkyne ethers or esters, such as (poly) ethylene glycol monomethyl ether(meth)acrylate, (poly) ethylene glycol monooctyl ether(meth)acrylate, (poly)ethylene glycol monolauryl ether(meth)acrylate, (poly) ethylene glycol monostearyl ether(meth)acrylate, (poly)ethylene glycol monooleyl ether(meth)acrylate, (poly)ethylene glycol monostearate ester (meth)acrylate, (poly)ethylene glycol monononylphenyl ether (meth)acrylate, (poly)propylene glycol monomethyl ether(meth)acrylate, (poly)propylene glycol monoethyl ether(meth)acrylate, (poly)propylene glycol monooctyl ether(meth)acrylate, (poly)propylene glycol monolauryl ether(meth)acrylate, and (poly)ethylene glycol (poly)propylene glycol monomethyl ether (meth)acrylate; and as monomers having an acid group (carboxyl group, sulfonic group or phosphoric group), carboxyl-containing monomers such as acrylic acid, methacrylic acid, maleic acid, acrylic acid dimer, itaconic acid, fumaric acid, crotonic acid, and monomers obtained by reacting maleic anhydride, succinic anhydride, phthalic anhydride or the like with hydroxyalkyl(meth)acrylates such as 2-hydroxyethyl (meth)acrylate and 4-hydroxybutyl(meth)acrylate, sulfonic-containing monomers such as styrenesulfonic acid, dimethylpropylsulfonic acid (meth) acrylamide, ethylsulfonate (meth)acrylate, ethylsulfonate (meth)acrylamide, and vinyl sulfonic acid, and phosphoric-containing monomers such as (di,tri)methacryloyloxyethyl phosphates. One or more of these monomers can be used. No particular limitation is imposed on the acid value of a polymer, which is governed by such acid groups.

Next, among monomers having an amino group, monomers with a primary amino group contained therein include vinylamine, allylamine, aminostyrene, 2-aminoethyl(meth)acrylate, 2-aminopropyl (meth)acrylamide, and the like, and monomers with a secondary amino group contained therein include vinylmethylamine, allylmethylamine, methylaminostyrene, t-butylaminoethyl(meth)acrylate, tetramethylpiperidyl(meth)acrylate, t-butylaminopropyl(meth)acrylamide, and the like.

Monomers with a tertiary amino group contained therein include dimethylaminoethyl(meth)acrylate, diethylaminoethyl(meth)acrylate, pentamethylpiperidyl(meth)acrylate, N-ethylmorpholine (meth)acrylate, dimethylpropyl (meth)acrylamide, vinylpyridine, vinylimidazole, vinylbenzotriazole, vinylcarbazole, dimethylaminostyrene, diallylmethylamine, and the like.

Monomers with a quaternary amino group contained therein include trimethyl ammonium styrene chloride, dimethyl lauryl aminostyrene chloride, vinyl methyl pyridinyl iodide, chlorotrimethylaminoethyl (meth)acrylate, chlorodiethylmethylaminoethyl (meth)acrylate, chlorobenzyldimethylaminoethyl (meth)acrylate, trimethylaminoethyl(meth)acrylate methyl sulfate, diallyldimethylammonium chloride, and the like.

The dye polymer can be provided with water solubility by polymerizing the above-described monomer, neutralizing these primary, secondary or tertiary amino groups with an acidic substance, for example, an inorganic acid such as hydrochloric acid, nitric acid or sulfuric acid, acetic acid, propionic acid or paratoluenesulfonic acid, and further, quaternizing the neutralization product with methyl chloride, methyl iodide, benzyl chloride or dimethylsulfuric acid.

Oxygen-containing monomers include glycidyl (meth)acrylate, tetrahydrofurfuryl(meth)acrylate, oxetanylmethyl (meth)acrylate, morpholine (meth)acrylate, methylmorpholine (meth)acrylate, methylmorpholinoethyl(meth)acrylate, and the like.

Nitrogen-containing monomers include (meth) acryloyloxyethyl isocyanate, (meth) acryloyloxyethoxyethyl isocyanate, blocked isocyanate-containing (meth)acrylates obtained by blocking these isocyanates with caprolactone or the like, ethyleniminoethyl(meth)acrylate, amide monomers such as (meth)acrylamide, N,N-dimethyl(meth)acrylamide, N,N-diethyl(meth)acrylamide, N-methylol(meth)acrylamide and N-butoxymethyl (meth)acrylamide, and the like. Also included are monomers which can also be obtained by reacting primary or secondary amines with the above-described glycidyl-containing monomers such as glycidyl (meth)acrylate. Further included are those which can be obtained by reacting primary or secondary amines after polymerization of such glycidyl-containing monomers.

In addition, other monomers include polyester-type mono (meth)acrylate esters obtained by subjecting lactones such as ε-caprolactone and γ-butyrolactone to ring-opening polymerization while using, as initiators, the above-described (poly) alkylene glycol mono(meth)acrylate esters such as (meth) acryloyloxyethyl mono- or poly(n≥2)caplolactone; ester-type (meth)acrylates obtained by reacting dibasic acids to the above-described (poly)alkylene glycol mono(meth)acrylate esters such as 2-(meth)acryloyloxyethyl-2-hydroxyethyl phthalate and 2-(meth)acryloyloxyethyl-2-hydroxyethyl succinate to half-esterify the dibasic acids and then reacting alcohols or alkylene glycols to the other carboxyl groups;

the mono(meth)acrylates of polyfunctional hydroxyl compounds having 3 or more hydroxyl groups, such as glycerol mono(meth)acrylate and dimethylolpropane mono(meth)acrylate; halogen-containing (meth)acrylates such as 3-chloro-2-hydroxypropyl(meth)acrylate, octafluorooctyl (meth)acrylate and tetrafluoroethyl (meth)acrylate; silicon-containing monomers having a trimethoxysilyl group or dimethyl silicone chain; UV-absorbing monomers such as 2-(4-benzoxy-3-hydroxyphenoxy)ethyl(meth)acrylate and 2-(2'-hydroxy-5-(meth)acryloyloxyethylphenyl)-2H-benzotriazole, said UV-absorbing monomers being particularly useful in providing dyes with improved light resistance; and α-hydroxymethyl-substituted acrylates such as ethyl-α-hydroxymethyl acrylate.

Also usable are macromonomers obtained by introducing unsaturated bonds to one ends of oligomers obtained by polymerizing the above-described monomers, and macromonomers obtained by using a cobalt compound such as cobalt morphine as a chain transfer agent and having unsaturated bonds at one ends thereof.

In addition, monomers having two or more addition-polymerizable groups can also be used as needed. Illustrative are divinylbenzene, ethylene glycol di(meth)acrylate, diethylene glycol di(meth)acrylate, the (meth)acrylate esters of polyalkylene glycol adducts of trimethylolpropane, the (meth) acrylate esters of alkylene oxide adducts of bisphenol A, and the like.

To a dye polymer with carboxyl groups or hydroxyl groups contained therein, a monomer which has an addition-polymerizable group and a reactive group capable of reacting to the carboxyl groups or hydroxyl groups may be reacted to provide the dye polymer with addition-polymerizable groups. Although not particularly limited, methacrylic groups can be introduced, for example, into a dye polymer, which has been obtained by polymerizing methacrylic acid as a copolymerization component and has carboxyl groups, by reacting glycidyl methacrylate to the dye polymer, and acrylic groups can be introduced, for example, into a dye polymer, which has been obtained by polymerizing 2-hydroxyethyl acrylate as a copolymerization monomer component and has hydroxyl groups, by reacting acryloyloxyethyl isocyanate to the dye polymer. Owing to addition-polymerizable groups, UV-curable properties or ER-curable properties can be imparted to the dye polymers.

When a dye polymer with acid groups introduced therein is neutralized with a conventionally-known alkaline substance, the dye polymer is rendered soluble, dispersible or emulsifiable in water. Examples of the alkaline substance include amines such as ammonia, diethanolamine, triethanolamine, morpholine, trimethylamine and triethylamine; and hydroxides such as sodium hydroxide, potassium hydroxide and lithium hydroxide.

As the radical polymerization initiator for use in the present invention, conventionally-known one is usable. No particular limitation is imposed on it, and commonly-employed organic peroxides and azo compounds can be used. Specific examples include benzoyl peroxide, dicumyl peroxide, diisopropyl peroxide, di-t-butyl peroxide, t-butyl peroxybenzoate, t-hexyl peroxybenzoate, t-butyl peroxy-2-ethylhexanoate, t-hexyl peroxy-2-ethylhexanoate, 1,1-bis(t-butylperoxy)-3,3,5-trimethylcyclohexane, 2,5-dimethyl-2,5-bis(t-butylperoxy)hexyl-3,3-isopro pylhydroperoxide, t-butyl hydroperoxide, dicumyl hydroperoxide, acetyl peroxide, bis(4-t-butylcyclohexyl)peroxydicarbonate, isobutyl peroxide, 3,3,5-trimethylhexanoyl peroxide, lauryl peroxide, 1,1-bis(t-hexylperoxy)-3,3,5-trimethylcyclohexane, 2,2'-azobis(isobutyronitrile), 2,2'-azobis(2,4-dimethylvaleronitrile), 2,2'-azobis(isobutyrate), and the like.

The dye polymer according to the present invention can be obtained by using and polymerizing at least the dye containing the initiating group of the formula (1), the addition-polymerizable monomer, the radical polymerization initiator and the catalyst as described above. When the dye raw compound having the initiating group is used, the dye polymer according to the present invention can be obtained by polymerizing the dye raw compound as described above and then reacting the resultant polymerization product with another compound as a color-developing agent.

In the polymerization according to the present invention, the molecular weight of the resulting polymer can be controlled depending on the amount of initiating groups. By setting the number of moles of a monomer relative to the number of moles of initiating groups, the resulting polymer can be controlled to a desired molecular weight or the magnitude of its molecular weight can be controlled. No particular limitation is imposed on the molar ratio of the initiating groups to the monomer. When 5,000 moles of a monomer having a molecular weight of 100 are polymerized by using 1 mole of initiating groups, for example, the molecular weight is calculated to be 1×100×5,000=500,000. Namely, a preset molecular weight can be calculated by:

Initiating groups 1 mole×the molecular weight of a monomer×the molar ratio of the monomer to the initiating groups In some instances, however, the polymerization process according to the present invention may be accompanied by a side reaction, that is, a coupling reaction of polymer radicals themselves or a disproportionation reaction, so that the actual molecular weight may not be controlled to the above-described calculated molecular weight but may become greater than a preset molecular weight. In contrast, the polymerization may terminate to result in a molecular weight smaller than the preset molecular weight. Preferred is a polymer obtained without such a side reaction and having a dye bonded to an end thereof. In the dye polymer according to the present invention, however, the dye is bonded to the polymer even if it has a greater molecular weight as a result of coupling or a molecular weight smaller than a preset molecular weight as a result of termination. The dye polymer is, therefore, still usable as a dye polymer without problem in the present invention even if it has been obtained while being accompanied by a side reaction.

The radical polymerization initiator can be used as much as preferably from 0.001 to 0.1 molar times, more preferably from 0.002 to 0.05 molar times the number of moles of the monomer. An unduly small use amount of the initiator results in insufficient polymerization, while an excessively large use amount of the initiator has a potential problem that a polymer without any dye bonded thereto may be formed.

The amount of the catalyst to be used in the present invention may be equal to or smaller than the number of moles of the radical polymerization initiator. An unduly large molar number controls polymerization so much that the polymerization does not proceed. Within the range of above-described mixing ratio, the use amount of the catalyst can be determined as desired, and no particular limitation is imposed thereon.

As the polymerization method in the present invention, the dye may be added along with the polymerization initiator and catalyst to the monomer, and polymerization may then be conducted in bulk. It is, however, preferred to conduct solution polymerization in a solvent that can dissolve the dye. The solid content of the polymerization mixture may be, but is not particularly limited to, from 5 to 80 wt %, with from 10 to 60 wt % being more preferred. Preferred is a concentration at which the dye having the group of the formula (1) is soluble.

No particular limitation is imposed on the solvent insofar as it can dissolve the dye. Examples include hydrocarbon solvents such as hexane, octane, decane, isodecane, cyclohexane, methylcyclohexane, toluene, xylene, ethylbenzene, and cumene; alcohol solvents such as methanol, ethanol, propanol, isopropanol, butanol, isobutanol, hexanol, benzyl alcohol and cyclohexanol; glycol solvents such as ethylene glycol, diethylene glycol, propylene glycol, dipropylene glycol, methyl cellosolve, ethyl cellosolve, butyl cellosolve, propylene glycol monomethyl ether, propylene glycol monoethyl ether, propylene glycol propyl ether, diglyme, triglyme, butyl carbitol, butyl triethylene glycol, methyl dipropylene glycol, methyl cellosolve acetate, propylene glycol monomethyl ether acetate, dipropylene glycol butyl ether acetate, and diethylene glycol monobutyl ether acetate;

ether solvents such as diethyl ether, dimethyl ether, dipropyl ether, methyl cyclopropyl ether, tetrahydrofuran, dioxane, and anisole; ketone solvents such as dimethyl ketone, diethyl ketone, isobutylmethyl ketone, cyclohexanone, isophorone, and acetophenones; ester solvents such as methyl acetate, ethyl acetate, butyl acetate, propyl acetate, methyl butyrate, ethyl butyrate, caprolactone, methyl lactate, and ethyl lactate; halogenated solvents such as chloroform, dichloromethane, and dichloroethane; amide solvents such as formamide, dimethylformamide, dimethylacetamide, pyrrolidone, methylpyrrolidone, and caprolactam; and dimethyl sulfoxide, sulfolane, tetramethylurea, ethylene carbonate, propylene carbonate, dimethyl carbonate, ethyl carbonate, nitromethane, acetonitrile, nitrobenzene, dioctyl phthalate, and the like.

The polymerization temperature in the present invention is not particularly limited, and may be preferably from 0° C. to 150° C., more preferably from 30° C. to 120° C. The polymerization temperature is adjusted depending on the half-life of the radical polymerization initiator to be used. Although it is preferred to continue the polymerization until the monomer is used up, the polymerization time is not particularly limited and may be, for example, from 0.5 hour to 48 hours, and as a practical time, preferably from 1 hour to 24 hours, more preferably from 2 hours to 12 hours.

The atmosphere of the polymerization system is not particularly limited, and may be an air atmosphere. In other words, oxygen may exist in a usual range in the system, or if necessary, the polymerization may be conducted under a nitrogen stream to eliminate oxygen. Further, the polymerization may be conducted under shading, but no problem arises even when the polymerization is conducted in a transparent vessel such as a glass vessel. As the monomer and the like to be used, commercial products can be used as they are although impurities may be removed by distillation or with activated carbon, alumina or the like.

The polymer portion of the dye polymer according to the present invention can take various higher-order structures. The polymer portion can take, for example, structures of a homopolymer obtained by polymerizing a single monomer, a random copolymer obtained by copolymerizing two or more monomers, block copolymers such as an AB-type block copolymer and a random block copolymer, and a gradient copolymer having a gradient in the arrangement of monomer repeating units. In the case of a homopolymer, a single monomer is used upon polymerization, and in the case of random copolymerization, two or more monomers are mixed and polymerized.

To produce a block copolymer, one or more monomers are first polymerized to obtain a polymer block A. Because the polymer block A is iodated at an end thereof and the end is alive in living polymerization, subsequent addition and polymerization of one or more other monomers initiate polymerization from the end of the polymer block A to form a polymer block B, and therefore, an A-B type block copolymer can be obtained. By adding and polymerizing a further monomer after the completion of the polymerization, a triblock copolymer of the A-B-C type, A-B-A type or the like can be obtained. Further, a tetrablock copolymer or the like can be also obtained.

By first initiating polymerization of one or more monomers and immediately adding a further monomer dropwise or by allowing the polymerization to proceed for a while and gradually adding the further monomer while the one or more monomers still remain, repeating units of these monomers can be arranged to obtain a gradient copolymer.

The molecular weight of the polymer bonded to the dye in the dye polymer according to the present invention may be preferably from 1,000 to 50,000, more preferably from 5,000 to 30,000 as a polystyrene-equivalent number average molecular weight measured by gel permeation chromatography (hereinafter abbreviated as "GPC"). Further, the polydispersity index (hereinafter abbreviated as "PDI"), which is the ratio of the number average molecular weight to a weight average molecular weight, can be controlled to 1.3 or smaller in the polymerization of the present invention. Further, a coupling reaction may take place as a side reaction, resulting in a greater polydispersity index. However, no particular limitation is imposed on PDI insofar as the dye polymer according to the present invention, in which the polymer is bonded to the dye, is concerned.

When a group of the formula (1) or (2) is bonded as an initiating group to a dye raw material, the dye raw material is polymerized likewise as a starting compound to obtain a dye raw polymer, and the dye raw polymer is then reacted with another compound to form a dye such that a dye polymer is obtained.

When the dye polymer is obtained by using the dye raw material having the initiating group of the formula (1), the color-developing reaction that is conducted after the polymerization is conventionally known and is not particularly limited. For example, a dye polymer according to the present invention can be obtained by using a coupler component for an azo dye as a dye raw material having the initiating group, conducting the polymerization of the present invention to obtain a coupler polymer, and then reacting a diazo compound to the coupler polymer. A dye polymer according to the present invention can also be obtained by conversely using an azo component having the initiating group, polymerizing it into an azo component polymer, and then reacting a coupler component to the azo component polymer. As a further example, when phthalodinitrile has the initiating group bonded thereto, a phthalocyanine-based dye polymer can be obtained by polymerizing it into a phthalodinitrile polymer, and then using urea and a metal salt such as a copper salt.

As the content proportions of the dye component and polymer component in the dye polymer according to the present invention, the dye contained in the dye polymer may preferably amount to from 1 to 50 wt %, with from 2 to 30 wt % being more preferred. A dye content lower than 1 wt % does not allow the dye polymer to develop a color sufficiently, while a dye content higher than 50 wt % leads to an excessively low content of the polymer component and results in a potential problem that the unreacted dye or the like may remain mixed in the dye polymer.

The dye polymer obtained as described above may be used in the form of the polymerization mixture, which is available from the polymerization, without any processing. If a sodium salt or the like is contained in the polymerization mixture and the inclusion of the sodium salt or the like creates a barrier to the application of the dye polymer, the sodium salt and other impurities can be removed by treating a solution of the dye polymer with a poor solvent and precipitating the dye polymer. Further, a solution of the dye polymer can be desolvated in a dryer, a spray dryer or the like to obtain the dye polymer in a solid form. The dye polymer can be used as it is, or can be used as a solution by dissolving it again in a solvent that can dissolve the polymer. When the dye polymer contains acid groups, an aqueous solution with an alkaline substance dissolved therein may be added to the polymerization mixture to make the dye polymer soluble in water.

A description will be made about use of the dye polymer according to the present invention.

First, the dye polymer according to the present invention is used for the preparation of a composite pigment which is a composition of the dye polymer and a pigment. The composite pigment can be prepared, for example, by (1) a method that adds the dye polymer upon synthesis of the pigment, (2) a method that synthesizes the pigment by using a pigment raw polymer as a part of a raw material or (3) a method that causes the dye polymer to exist in particles of the pigment or on the surfaces of the particles of the pigment by allowing the dye polymer to exist upon kneading or dispersing the pigment and then precipitating the dye polymer, and can achieve microparticulation of the pigment, a change in the crystallinity of the pigment, adjustments of surface properties of the pigment, and an improvement in the dispersibility of the pigment.

A description will first be made about the method (1) that upon synthesis of a pigment, adds a dye polymer to synthesize the pigment. When a pigment is synthesized by adding to a pigment raw material a dye polymer having the same or a similar dye structure as the pigment upon synthesis of the pigment, the resulting pigment and the dye component of the dye polymer are the same or similar in structure so that upon formation of particles or crystals of the pigment, the dye portion of the dye polymer is incorporated in or adsorbed on the pigment particles and a pigment composition (composite pigment) in which the dye polymer and the pigment are combined together is obtained.

In the above-described method, the pigment and its synthesis process are not particularly limited, and upon synthesis of the pigment, the dye polymer can be added to form the composite pigment. In particular, the synthesis of the pigment may preferably be conducted in a solvent in which the dye polymer is soluble. When an azo pigment is synthesized, for example, the dye polymer may preferably be one that is soluble in an aqueous alkaline solution. When a diketopyrrolopyrrole pigment is synthesized in a solvent, it is preferred to use a dye polymer that is soluble in the solvent.

In the above-described method, the weight ratio of the pigment to the dye polymer to be used is not particularly limited, but may preferably range from 30:70 to 95:5. An excessively small use amount of the pigment has a potential problem that some of the dye polymer may remain unabsorbed on the pigment, while an unduly small use amount of the dye polymer cannot sufficiently bring about the advantageous effects which are available from the use of the dye polymer.

A description will next be made about the above-described method (2). This method obtains a composite pigment by synthesizing a pigment while using a dye raw polymer as a part of a raw material for the pigment. By using the dye raw polymer as the part of the raw material for the synthesis of the pigment, another raw material component for the pigment is processed into the pigment, and at the same time, the dye raw polymer also forms the pigment, so that the dye polymer is incorporated in particles of the pigment to obtain a composite pigment in which the dye polymer is combined with the particles of the pigment.

For example, a composite azo pigment can be obtained by coupling a coupler polymer with an azo component concurrently with another coupler upon synthesis of an azo pigment. A composite azo pigment can also be obtained by conversely coupling an azo component polymer with another azo component and a coupler at the same time. Further, an azo component polymer, a coupler component polymer and other materials may be combined into a composite pigment. Similar to the foregoing, the species of a dye raw polymer should be selected corresponding to a solvent to be employed upon synthesis of a pigment.

The amount of the dye raw polymer to be used in the above method is optional, but the weight ratio of the another raw material to the dye raw polymer may preferably be from 30:70 to 95:5 as described above. An unduly small use amount of the pigment involves a potential problem that some of the dye raw polymer may remain unincorporated in the pigment, while an excessively small use amount of the dye raw polymer cannot sufficiently bring about the advantages effects which are available from the use of the dye raw polymer.

A description will next be made of the above-described method (3). According to this method, in a microparticulation step of a coarse pigment such as processing of the coarse pigment into a pigment (milling with an inert salt) or a kneading step of the pigment and a resin, the dye polymer according to the present invention is added and kneaded, and if necessary, a poor solvent is added to precipitate the dye polymer. As an alternative, after a pigment is dispersed in the presence of the dye polymer as a pigment dispersant, the dye polymer is precipitated with a poor solvent. Especially when the dye polymer is in an neutralized, water-soluble form, the dye polymer is precipitated by changing the pH of a mixture system. In this case, a desired composite pigment can be obtained as a result of adsorption or deposition of the dye polymer on the surfaces of particles of the pigment.

The above-described method will be specifically exemplified. First, in the ultrafine division step of the coarse pigment such as the processing of the coarse pigment into the pigment (milling of the coarse pigment with the inert salt) or the kneading step of the pigment and the resin, the dye polymer according to the present invention is added to a kneading system, and if necessary, the dye polymer is precipitated with the poor solvent. As a machine to be used, a conventionally-known kneading machine such as a kneader, extruder or ball mill is used. The pigment and dye polymer are kneaded at room temperature or under heat for 30 minutes to 60 hours, preferably for 1 hour to 12 hours. The dye polymer may be used in an amount of preferably from 1 to 100 wt %, more preferably from 5 to 50 wt % based on the pigment. It is also preferred to incorporate in the kneading system a carbonate salt or chloride as a fine medium for microparticulating the pigment and also to use a viscous solvent such as ethylene glycol or diethylene glycol for performing the kneading under lubrication, both as needed. The carbonate salt or the like may be used as much as preferably from 1 to 30 weight times, more preferably from 2 to 20 weight times the pigment. The resulting kneaded mixture of the pigment and the salt or the like is next added to water to precipitate the pigment, and the salt or the like is thoroughly removed to obtain a water-based paste of the pigment. The water-base paste is used either as it is or after it is dried and ground. Further, the dye polymer precipitates or deposits on the surfaces of particles of the pigment by allowing the dye polymer to exist in a mixture system upon treating the pigment as an emulsion in xylene to effect its crystal growth.

A description will next be made of the method for obtaining the composite pigment by precipitating the dye polymer with the poor solvent after dispersing the pigment in the presence of the dye polymer as the dispersant. This method makes use of the dye polymer according to the present invention as the dispersant upon dispersing the pigment in a conventionally-known manner. In this case, one or more other known dispersants may be used in combination. The poor solvent is added to the resulting pigment dispersion to precipitate the dye polymer such that the dye polymer is precipitated or deposited on the surfaces of the pigment. No particular limitation is imposed on the dispersion method of the pigment, and a conventionally-known method can be used.

The weight ratio of the pigment to the dye polymer is not particularly limited, but may preferably be from 30:70 to 95:5.

A description will be made of a case in which the dye polymer according to the present invention is used as a dispersant for a pigment or a co-existing polymer with a pigment in a water-based dispersion. In this case, acid groups or basic groups of the dye polymer have been neutralized so that the dye polymer is soluble in water. By changing the pH of the mixture system of the pigment, the dye polymer is rendered insoluble in water to precipitate or deposit the dye polymer on the pigment. When the dye polymer had the acid groups, the dye polymer has been neutralized with an alkaline substance. The dye polymer is, therefore, neutralized and precipitated with an acidic aqueous solution. When the dye polymer had the basic groups, on the other hand, the dye polymer has been neutralized with an acidic substance. A basic substance is, therefore, added to precipitate the dye polymer. In this manner, the dissolved dye polymer is rendered insoluble in water, and precipitates or deposits on the surfaces of the pigment. The pigment and dye polymer can be used at a similar weight ratio as described above. The resultant dispersion may be dried as it is.

As a specific method for precipitating the dye polymer, the pigment dispersion with the dye polymer contained therein is provided as it is or is preferably converted into a water-based dispersion having a pigment content of 5 wt % or lower, and an aqueous solution of an acidic or alkaline substance is then added. If necessary, the dispersion may be heated to coagulate the pigment particles. By this method, the composite pigment of the dye polymer according to the present invention and the pigment can be obtained.

Since the composite pigment according to the present invention contains the dye polymer in the pigment particles, the dye polymer becomes a soluble component when the composite pigment is added to a solvent or an aqueous alkaline or acidic solution. As a consequence, the pigment is brought into a dispersed state. Use of a fine particulate pigment can, therefore, afford a microparticulated pigment dispersion. In the above-described dispersing processing of the pigment, a dispersing machine such as a vertical bead mill, horizontal bead mill or ball mill can be used as needed.

In the dye polymer according to the present invention, the polymer portion is meltable under heat. When melt-kneading a resin and the composite pigment, the dye polymer thus acts as a dispersant so that the pigment is dispersed well in the resin to obtain a colored resin. No particular limitation is imposed on the concentration of the pigment in the colored resin.

The dye polymer or composite pigment according to the present invention (which may hereinafter be called "the coloring agent according to the present invention") can be obtained as described above. The coloring agent according to the present invention can be used as a coloring agent in paints, inks, coating formulations, stationery, textile printing inks and pastes, dope dyeing colorants, plastic moldings, inkjet inks, color filters, UV and/or ER curing agents, and fine toner particles; and further, the dye polymer can also be used as a pigment dispersant in pigment dispersions, and as a binder in paints, inks, coating formulations, stationery, textile printing inks and pastes, inkjet inks and color filters.

A description will first be made of embodiments that use the coloring agent according to the present invention.

In the coloring agent according to the present invention, the polymer is covalently bonded to the dye, and the polymer portions act as soluble groups to dissolve or disperse the dye, which is inherently sparingly soluble, in a solvent or water. Further, the polymer portions of the dye polymer are high in molecular weight and are meltable under heat so that, when the dye polymer is used for the coloration of a resin, the dye polymer neither bleed out nor migrate onto other articles. By making use of these advantageous properties, the coloring agent according to the present invention can be used for the above-described various applications. In the composite pigment, the polymer portions of the dye polymer become soluble or meltable as described above, and therefore, can disperse the pigment well in a liquid medium or a resin.

Applications of the coloring agent according to the present invention are as described above, and the coloring method by the coloring agent and the mixing proportion and the like of the coloring agent are similar to the conventionally-known method and mixing proportion. Described specifically, the coloring agent according to the present invention can be used as a coloring agent for conventionally-known, water-based or oil-based paints. In these applications, colored paints can each be obtained by simply dissolving or dispersing the coloring agent according to the present invention in a paint vehicle or the like. In applications for offset inks, a water-based OP varnish can be used as a colored gloss coating formulation, and the coloring agent according to the present invention can also be used as a coloring agent for a UV-curable flexographic gravure ink. In applications for gravure inks, the coloring agent according to the present invention can be used for the coloration of a water-based, flexographic, gravure ink or a surface printing/backing printing gravure ink, and can also be used as a coloring agent for wet-type urethane leather.

The colorant agent according to the present invention can also be used as a colorant agent for a water-based, oil-based or UV-curable inkjet ink. When the inkjet ink is water-based, a dye polymer having acid groups can be used after its neutralization, the incorporation of a binder component is not absolutely needed, and printing is feasible by driving out the ink as it is. In the case of the UV-curable inkjet ink, the above-described UV-curable unsaturated bonds can be introduced into the dye polymer so that the dye polymer can be converted into a UV-curable dye polymer by making use of the unsaturated bonds. When the coloring agent according to the present invention is used for stationery, no binder is needed and the coloring agent can be used in a desired solvent and/or water system. When the coloring agent according to the present invention emits fluorescence, the coloring agent can be used as a fluorescent color. Use of such a coloring agent that emits light upon exposure to ultraviolet light is effective for anti-forgery or as a security measure.

The coloring agent according to the present invention can also be used for the mass-coloring of fibers, for colored plastics (by dissolving the coloring agent in raw material monomers and performing bulk polymerization), and for color toners. Production processes of a color toner generally include the grinding process and the polymerization process. In the polymerization process, a color toner can be obtained by dissolving or dispersing the dye polymer or composite pigment according to the present invention in a monomer and then conducting suspension polymerization or by adding the dye polymer or composite pigment according to the present invention to a toner binder solution, suspending the resultant mixture in water to form particulate droplets, and then distilling off the solvent to form fine particles. Especially in the composite pigment according to the present invention, the polymer is bonded on the surfaces or the pigment, and after the fixing of the toner, prevents coagulation of the pigment, so that high color-developing property and high color reproducibility are exhibits. In addition, electrostatic properties can be controlled by the functional groups of the dye polymer. Similarly, colored fine particles can also be obtained. These colored fine particles can be obtained by dissolving the dye polymer in a monomer, forming the resultant solution into droplets by using a suspending agent such as polyvinyl alcohol, and then conducting polymerization. In the case of a so-called dye, dye molecules tend to bleed out, and therefore, the so-called dye requires surface encapsulation or the like. In contrast, the dye polymer according to the present invention does not bleed out. Further, the pigment has to be dispersed upon use. In contrast, the dye polymer according to the present invention can be readily dissolved, and therefore, requires no dispersion.

In miniemulsion polymerization, a miniemulsion mixture can be obtained by dissolving the dye polymer in a monomer, agitating the resultant solution at high speed while using, for example, cetyl alcohol or the like as an oil-soluble component together with an emulsifier, thereby obtaining an emulsion having a droplet size of 500 nm or smaller, and then subjecting the emulsion to polymerization in the presence of a radical polymerization initiator.

The dye polymer according to the present invention can be melted, and therefore, can be used as a coloring agent for fibers and plastics. Plastics can be colored by using in a kneader or extruder a dye polymer compatible with the plastics, for example, a dye polystyrene in the case of polystyrene, a dye poly methyl methacrylate in the case of polymethacrylic resin, and a dye polymer, which has been obtained by polymerizing a methacrylate or acrylate having a higher alkyl group, in the case of polyethylene. In the above-described grinding method of color toner, the toner can be obtained by melt-kneading the dye polymer according to the present invention in a binder such as a styrene-acryl copolymer or polyester and grinding and classifying the resultant mixture.

By blending plural dye polymers of different hues, a color tone different from the hues of the original dye polymers can be produced. For example, a green color can be obtained from a cyan color and a yellow color, and a black color can be obtained from a magenta color, a yellow color and a blue color. In other words, color matching is feasible. No particular limitation is imposed on the concentration of each dye, and the proportions of plural dye polymers to be blended should be determined based on a color to be produced.

The dye polymer according to the present invention can be used as a pigment dispersant. When as the pigment portion of the dye polymer, one having the same structure or a similar structure as a pigment to be dispersed is used, the pigment and the dye portion of the dye polymer have the same or similar structure so that the dye polymer is adsorbed on surfaces of the pigment and the dye polymer functions as a pigment dispersant. The polymer portions of the dye polymer act as soluble portions in a solvent or water. After the dye portions have adsorptively acted on the pigment, the polymer portions hence maintain the dispersion stability of the pigment through steric hindrance and electric repulsion. The dye polymer according to the present invention can be used as a pigment dispersant for the above-described paints, inks, inkjet inks, stationery colors, textile printing inks and pastes, and UV-curable or ER-curable coating formulations, and also, as a pigment dispersant for color filters.

As a dispersant for these applications, the dye polymer according to the present invention can be used in an amount of preferably from 1 to 200 wt %, more preferably from 5 to 100 wt % based on the pigment. The mixing and dispersing method of the pigment is conventionally known, and is not particularly limited. The dispersion can also be conducted by using one or more of conventionally-known dispersants in combination.

Exemplifying the dispersion method, dispersion processing is performed in a dispersing machine by using the dye polymer according to the present invention, a solvent, a pigment and a liquid medium, and if necessary, adding various additives. The pigment and the pigment dispersant are mixed in the liquid medium, followed by provisional mixing as needed. The resulting mixture is then dispersed in the dispersing machine to obtain a pigment dispersion. No particular limitation is imposed on the dispersing machine which can be used in the present invention, and a conventionally-known dispersing machine can be used. For example, a kneader, an attritor, a ball mill, a sand mill, horizontal medium-containing dispersing machine or colloid mill making use of glass or zircon, or the like can be used.

The pigment concentration in the pigment dispersion, which makes use of the dye polymer according to the present invention as a dispersant, varies depending on the kind of the pigment, but may be from 0.5 to 50 wt %, preferably from 0.5 to 30 wt % in the dispersion in the case of an organic pigment or may be from 10 to 70 wt % in the dispersion in the case of an inorganic pigment. The dispersant may desirably be contained as much as from 5 to 500 parts by weight per 100 parts by weight of the pigment. The viscosity of the dispersion can be determined as desired depending on the application.

In the pigment dispersion, various additions can be incorporated in addition to the pigment, dispersant and liquid medium. Usable examples include durability improvers such as ultraviolet absorbers and antioxidants, anti-settling agents, repellents or repellency enhancers, fragrances, antibacterial agents, antimolds agents, plasticizers, antidrying agents, and the like. Further, other dispersants, dispersion aids, pigment treatment agents, so-called dyes and the like can be also incorporated as needed.

The thus-obtained pigment dispersion may be used as it is, but from the standpoint of providing the dispersion with higher reliability, it is preferred to remove, by a centrifuge, ultracentrifuge or filter, coarse particles which may exist slightly.

The dye polymer according to the present invention can be used as a binder. As the dye polymer to be used as a binder contains the dye in the polymer, a colored coating can be formed by simply applying a solution of the dye polymer as it is. The colored film may also be formed by adding another binder as needed. The dye polymer according to the present invention can be used as a binder component for such paints, offset inks, gravure inks, inkjet inks, stationery colors and textile printing agents as described above. The method of its use is conventionally known, and is not particularly limited.

As various functional groups can be introduced in the dye polymer according to the present invention, a strong coating can be obtained by conducting a curing reaction while using such functional groups. When carboxyl groups are contained in the dye polymer, for example, a three-dimensional network structure can be formed by adding a carbodiimide crosslinking agent, oxazoline crosslinking agent, epoxy crosslinking agent, melamine crosslinking agent or the like as a curing agent and conducting a reaction. When hydroxyl groups are contained in the dye polymer, an isocyanate crosslinking agent, melamine crosslinking agent or the like can be used as a curing agent. When glycidyl groups or isocyanate groups are contained in a resin, a low molecular compound or high molecular compound, which can react with such groups, can be added to three-dimensionally cure the resin. When methylol groups, methoxymethyl groups, trimethylsilyl groups or the like are contained in a resin, a compound capable of reacting with such groups can also be added and reacted, whereby the resin can be caused to undergo self-condensation into a three-dimensional structure.

EXAMPLES

The present invention will next be described more specifically based on examples and comparative examples, although the present invention shall not be limited at all by these examples. It is to be noted that all "parts" and "%" in the subsequent description are on a weight basis.

Synthesis Example 1

Copper Phthalocyanine Initiator (Cyanine-4)

Into a reactor fitted with a stirrer, reflux condenser and thermometer, 4-nitrophthalimide (69.2 parts), cuprous chloride (13.4 parts), urea (48 parts) and dichlorobenzene (ODB; 200 parts) were charged, followed by refluxing under stirring. The reaction mixture was then filtered, and the filter cake was deflocculated in methanol (1 L). The resulting slurry was filtered, and the filter cake was washed with water and then dried. Copper tetranitrophthalocyanine (69.5 parts) was obtained as blue powder. Its yield was 93%.

The copper tetranitrophthalocyanine (37.6 parts), stannous chloride (37.9 parts) and concentrated hydrochloric acid (60 parts) were next charged into a similar reactor, followed by refluxing for 5 hours. The reaction mixture was filtered, and the filter cake was washed with a 3% aqueous solution of hydrochloric acid and further with methanol. The filter cake was deflocculated in methanol (1 L), and the resulting slurry was neutralized with aqueous ammonia while using a pH meter. The neutralized slurry was filtered, and the filter cake was thoroughly washed with deionized water and was then dried. Copper tetraminophthalocyanine (30.2 parts) was obtained as blue powder. Its yield was 95%.

A dropping funnel was then fitted on a similar reactor. The copper tetraminophthalocyanine (19.8 parts) and N-methylpyrrolidone (NMP; 200 parts) were charged and then stirred to dissolve the copper tetraminophthalocyanine. Triethylamine (12.2 parts) was further charged, followed by stirring. From the dropping funnel, 2-bromoisobutyric acid bromide (27.5 parts) was added dropwise over 1 hour, and the resulting mixture was then stirred at 60° C. for 8 hours. After completion of the reaction, the reaction mixture was poured into deionized water (2,000 parts) to precipitate the reaction product. The reaction product was collected by filtration, thoroughly washed with deionized water, and then dried. Copper tetra(2-bromoisobutyramido)phthalocyanine (35.2 parts) was obtained as bluish green powder. Its yield was 91.5%. This will be called "Cyanine-4".

Analyses of Cyanine-4 were conducted. As a result of determination of its purity by HPLC, substantially a single peak was observed, and its purity was calculated to be 98.6%. Further, the formation of amide bonds was confirmed by IR, and by an elemental analysis, the bromine content was found to be 23.4%. In NMR, a peak was too broad to perform any further study due to the inclusion of the copper atom. Further, a maximum absorption wavelength was measured by a spectrophotometer, and as a result, λmax=605 nm. The structural formula is shown below.

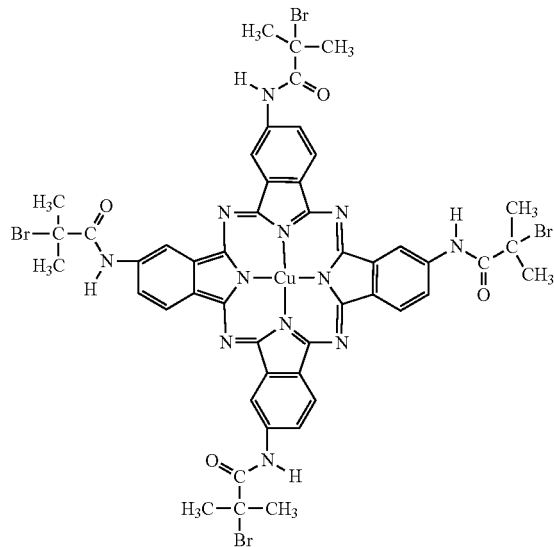

Synthesis Example 2

Copper Phthalocyanine Initiator (Cyanine-1)

As in Synthesis Example 1 except that 4-nitrophthalimide (17.3 parts) and phthalimide (44.1 parts) were used in place of 4-nitrophthalimide, a similar reaction was conducted in the same mole relationships in chemical reaction to obtain copper mononitrophthalocyanine (57.1 parts). In a similar manner as in Synthesis Example 1, reduction was conducted to convert the nitro group into an amino group, and further, the amino group was likewise converted with triethylamine and 2-bromoisobutyric acid bromide into a 2-bromoisoburyramido group to obtain copper mono(2-bromoisobutyramido)phthalocyanine (20.1 parts). Its yield was 90.5%. This will be called "Cyanine-1".

Cyanine-1 is considered to contain on average one 2-bromoisobutyramido group introduced onto the phthalocyanine ring. As a result of measurement by HPLC, five peaks were confirmed. This result is considered to indicate that in the synthesis of the copper nitrophthalocyanine as the raw material, copper phthalocyanine in which no nitro group was introduced was formed to result in the production of the monosubstitute, disubstitute, trisubstitute and tetrasubstitute, and that Cyanine-1 is a mixture of these substitutes. The formation of amide bonds was confirmed by IR, and by an elemental analysis, the bromine content was found to be 10.21%. In NMR, a peak was too broad to perform any further study due to the inclusion of the copper atom as in Synthesis Example 1. Further, a maximum absorption wavelength was measured by the spectrophotometer, and as a result, λmax=674 nm. The structural formula is shown below.

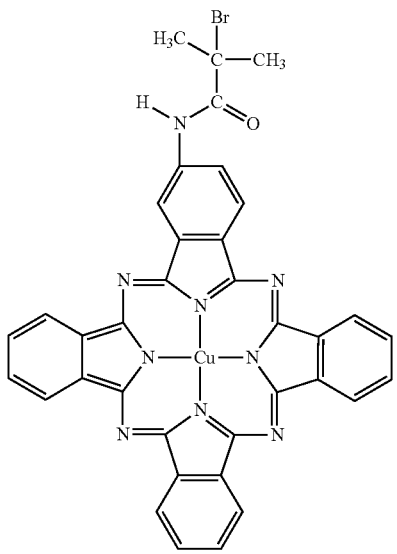

Synthesis Example 3

Dioxazine Violet Initiator (Dioxazine-2)

Using a similar reactor as in Synthesis Example 1, PV-23 (dioxazine violet; 20 parts) was dissolved in concentrated sulfuric acid (130 parts). The solution was then cooled to 5° C. or lower, and a mixture (100 parts) of concentrated sulfuric acid and concentrated nitric acid at a weight ratio of 1:1 was gradually added such that the reaction temperature did not exceed 5° C. The reaction mixture was stirred further at 5° C. for 3 hours. The reaction mixture was gradually added to iced water (1,500 parts) to precipitate the reaction product. The precipitates were then collected by filtration, thoroughly washed with deionized water, and dried to obtain dinitrodioxazine violet (21.5 parts) as dark violet powder.

In a similar manner as in Synthesis Example 1, the nitro groups were then reduced into amino groups, followed by amidation with 2-bromoisobutyric acid bromide to obtain di(2-bromoisoburyramido)dioxazine violet (21.2 parts) as dark violet powder. This will be called "Dioxazine-2".

As a result of its analysis by HPLC, the peak derived from the dioxazine violet or the dinitro- or diaminodioxazine violet as the raw material was not observed. Two peaks were observed, one corresponding to the 2-bromoisobutyramido monosubstitute, and the other to the 2-bromoisobutyramido disubstitute. The ratio of the monosubstitute to the disubstitute was calculated to be 23:87 from their area ratio.

Next, the compound was identified by IR and NMR, and by an elemental analysis, the bromine content was found to be 15.6%. Further, a maximum absorption wavelength was measured by the spectrophotometer, and as a result, λmax=612 nm. The structural formula is shown below.

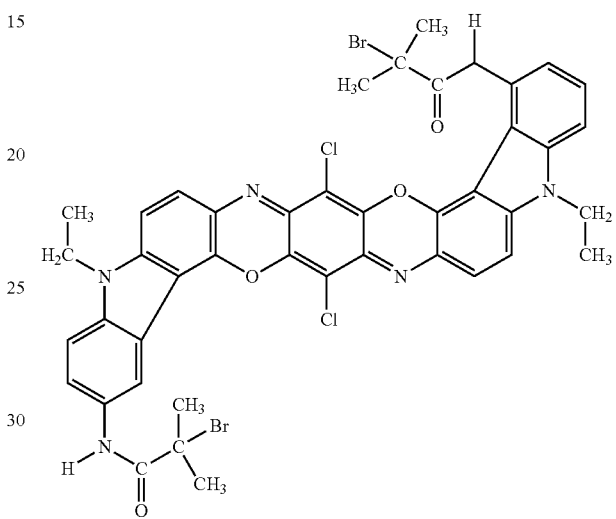

Synthesis Example 4

Coupler Initiator (Coupler-1)

On a similar reactor as in Synthesis Example 1, a dropping funnel was fitted. N-Methylpyrrolidone (NMP, 100 parts) and naphthol (ASBS-D, 27.8 parts) were charged, and the naphthol was then dissolved, followed by addition of triethylamine (10.1 parts). From the dropping funnel, 2-bromoisobutyric acid bromide (22.9 parts) was added dropwise over 1 hour, and the resulting mixture was then heated to 60° C., at which a reaction was conducted for 5 hours. The reaction mixture was poured into deionized water (1,000 parts) under stirring to precipitate the reaction product. The reaction product was collected by filtration, thoroughly washed with deionized water, and then dried. 2-Bromoisobutyramidonaphthaol (ASBS-D, 40.3 parts) was obtained as pale brown powder. This will be called "Coupler-1".

In a similar manner as in Synthesis Example 3, Coupler-1 was identified by IR and NMR to confirm its structure. By HPLC, its purity was determined to be 98.2%. By an elemental analysis, the bromine content was found to be 17.5%. The structural formula is shown below.

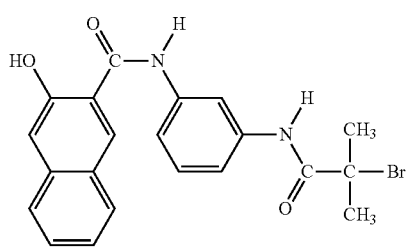 [SMILES: CC(C)(Br)C(=O)Nc1cccc(NC(=O)c2cc3ccccc3cc2O)c1]

Synthesis Example 5

Blue Disazo Initiator (Disazoblue-2)

In a similar reactor as in Synthesis Example 1, water (500 parts) were placed, and cooled such that its temperature dropped to 5° C. or lower. Into the reactor, 4,4'-diaminophenylsulfone (24.8 parts) was charged, followed by addition of concentrated hydrochloric acid (330 parts). Then, 10% sodium nitrite (138 parts) was added to conduct diazotization.

Further, Coupler-1 (42.6 parts) obtained in Synthesis Example 4 and a 5% aqueous solution of sodium hydroxide (852 parts) were charged into a separate vessel. The contents were cooled to 5° C., at which Coupler-1 was dissolved. To the solution, the aqueous diazo solution obtained as described above was added to conduct a coupling reaction. Navy blue precipitates were formed. The precipitates were collected by filtration, thoroughly washed with water, and then dried to obtain a blue disazo dye as navy blue powder. This will be called "Disazo Blue-2".

In a similar manner as in Synthesis. Example 3, the structure of Disazo Blue-2 was confirmed by NMR and IR. By HPLC, its purity was determined to be 99%. By an elemental analysis, the bromine content was found to be 14.0%. Further, a maximum absorption wavelength was measured by the spectrophotometer, and as a result, λmax=600 nm. The structural formula is shown below.

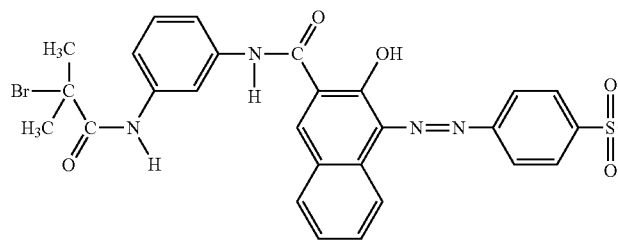

Synthesis Example 6

Red Monoazo Initiator (Monoazo Red-2)

In a similar manner as in Synthesis Example 5 except for the use of aniline as an azo component, a reaction was conducted to obtain a red monoazo dye as yellowish red powder.

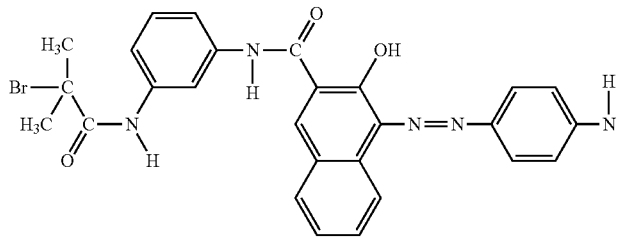

This will be called "Monoazo Red-2". In a similar manner as in Synthesis Example 3, the structure of Monoazo Red-2 was confirmed by NMR and IR. By HPLC, its purity was determined to be 99%. By an elemental analysis, the bromine content was found to be 14.7%. Further, a maximum absorption wavelength was measured by the spectrophotometer, and as a result, λmax=516 nm. The structural formula is shown below.

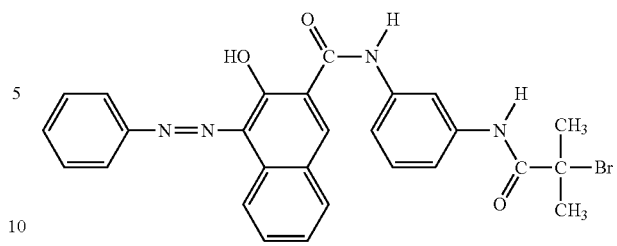

Synthesis Example 7

Red Disazo Initiator (Disazo Red-2)

Ina similar manner as in Synthesis Example 5 except for the use of bis(4-aminophenyl)amine as an azo component, a reaction was conducted to obtain a red monoazo dye as yellowish red powder. This will be called "Disazo Red-2". In a similar manner as in Synthesis Example 3, the structure of Disazo Red-2 was confirmed by NMR and IR. By HPLC, its purity was determined to be 98.3%. By an elemental analysis, the bromine content was found to be 14.5%. Further, a maximum absorption wavelength was measured by the spectrophotometer, and as a result, λmax=529 nm. The structural formula is shown below.

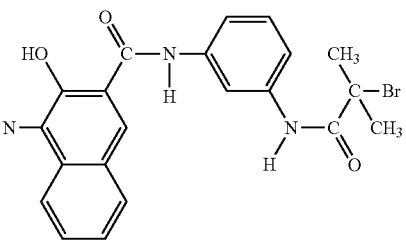

Synthesis Example 8

Perylene Initiator (Perylene-2)

To a similar reactor as in Synthesis Example 1, 3,4,9,10-perylenetetracarboxylic anhydride (39.2 parts), para-aminophenol (21.8 parts), zinc acetate (18.3 parts) and ODB were added to give a solid content of 10%, followed by refluxing for 8 hours under stirring. The reaction mixture was filtered, and the filter cake was thoroughly washed with methanol and then dried to obtain reddish brown powder. In a similar manner as in Synthesis Example 1, the reddish brown powder was esterified with 2-bromoisobutyric acid bromide to obtain a 2-bromoisobutylate ester substitute. This will be called "Perylene-2".

Following the foregoing procedure, Perylene-2 was analyzed to confirm its structure. The ester groups were confirmed by IR. By HPLC, its purity was determined to be 88.1%. By an elemental analysis, the bromine content was found to be 16.3%. Further, a maximum absorption wavelength was measured by the spectrophotometer, and as a result, λmax=525 nm. The structural formula is shown below.

reduced for amination, followed by amidation with 2-bromoisobutyric acid bromide to obtain a 2-bromoisobutyric acid substitute. This will be called "Quinoline-1". In a similar manner as in Synthesis Example 3, the structure of Quinoline-1 was confirmed by NMR and IR. By HPLC, its purity was determined to be 91.0%. By an elemental analysis, the bromine content was found to be 16.5%. A maximum absorption wavelength was measured by the spectrophotometer, and as a result, λmax=445 nm. The structural formula is shown below.

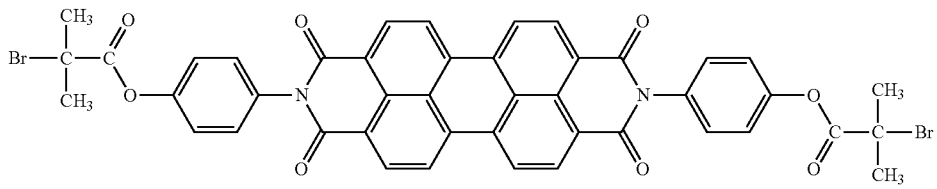

Synthesis Example 9

Yellow Monoazo Initiator (Azo Yellow-1)

In a similar manner as in Synthesis Example 5, a nitro-containing monoazo dye was obtained by using para-nitroaniline and acetoacetic acid para-aniside in place of 4,4'-diaminophenylsulfone and Coupler 1, respectively. In a similar manner as in Synthesis Example 1, the nitro group was reduced into an amino group. The resulting compound was amidated with 2-bromoisobutyric acid bromide to obtain a 2-bromoisobutylic acid amide substitute. This will be called "Azo Yellow-1".

In a similar manner as in Synthesis Example 3, the structure of Azo Yellow-1 was confirmed by NMR and IR. By HPLC, its purity was determined to be 93.9%. By an elemental analysis, the bromine content was found to be 16.0%. A maximum absorption wavelength was measured by the spectrophotometer, and as a result, λmax=449 nm. The structural formula is shown below.

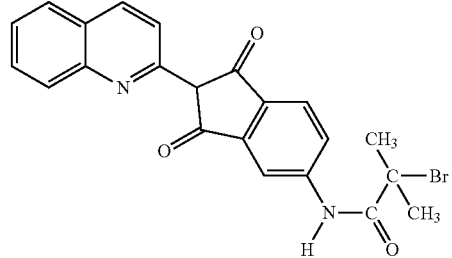 [SMILES: CC(C)(Br)C(=O)Nc1ccc2c(c1)C(=O)C(c1ccc3ccccc3n1)C2=O]

Synthesis Example 11

Benzimidazolone Initiator (Benz-1)

In a similar manner as in Synthesis Example 5, a nitro-containing monoazo dye was obtained by using para-nitroaniline and N-acetoacetamidobenzimidazolone in place of 4,4'-diaminophenylsulfone and Coupler 1, respectively. In a similar manner as in Synthesis Example 1, the nitro group was reduced into an amino group. The resulting compound was amidated with 2-bromoisobutyric acid bromide to obtain a 2-bromoisobutylic acid amide substitute. This will be called "Benz-1". In a similar manner as in Synthesis Example 3, the structure of Benz-1 was confirmed by NMR and IR. By HPLC, its purity was determined to be 98.5%. By an elemental analysis, the bromine content was found to be 15.5%. A maximum absorption wavelength was measured by the spectrophotometer, and as a result, λmax=409 nm. The structural formula is shown below.

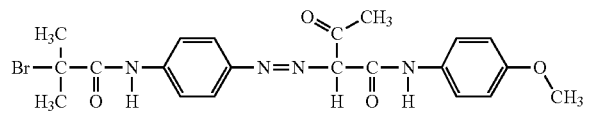

Synthesis Example 10

Quinoline Initiator (Quinoline-1)

Using a similar reactor as in Synthesis Example 1, chinaldine (14.3 parts), 4-nitrophthalic acid (21.1 parts), zinc chloride (13.6 parts) and ODB (100 parts) were charged, followed by refluxing for 2 hours under stirring. The reaction mixture was filtered, and the filter cake was thoroughly washed with water and then dried to obtain 4-nitroquinoline. In a similar manner as in Synthesis Example 1, the 4-nitroquinoline was

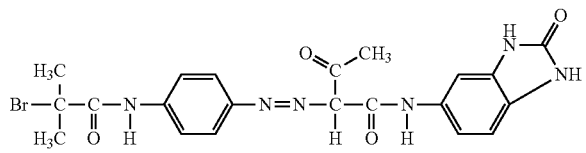

Synthesis Example 12

Disazo Yellow Initiator (Disazo Yellow-2)

In a similar manner as in Synthesis Example 5, a nitro-containing monoazo dye was obtained by using para-nitroaniline and N,N'-paraphenylene bisacetoacetamide in place of 4,4'-diaminophenylsulfone and Coupler 1, respectively. In a similar manner as in Synthesis Example 1, the nitro groups were reduced into amino groups. The resulting compound was amidated with 2-bromoisobutyric acid bromide to obtain a 2-bromoisobutylic acid amide substitute. This will be called "Disazo Yellow-2".

In a similar manner as in Synthesis Example 3, the structure of Disazo Yellow-2 was confirmed by NMR and IR. By HPLC, its purity was determined to be 98.4%. By an elemental analysis, the bromine content was found to be 19.2%. A maximum absorption wavelength was measured by the spectrophotometer, and as a result, λmax=454 nm. The structural formula is shown below.

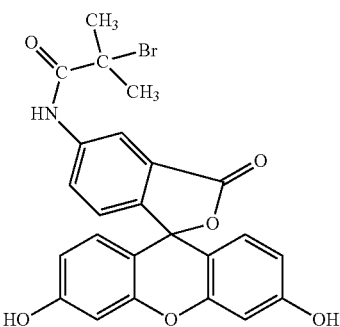

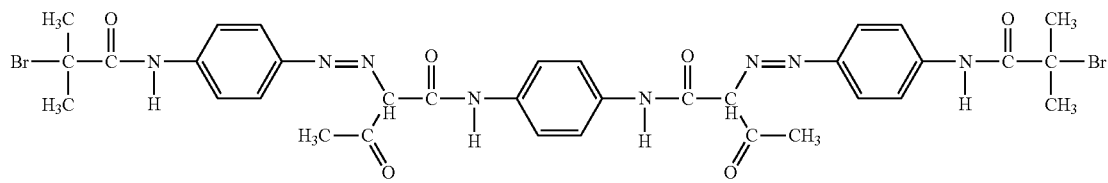 [SMILES: CC(=O)C(N=Nc1ccc(NC(=O)C(C)(C)Br)cc1)C(=O)Nc1ccc(NC(=O)C(N=Nc2ccc(NC(=O)C(C)(C)Br)cc2)C(C)=O)cc1]

Synthesis Example 13

Quinacridone Initiator (Quinacri-2)

In a similar manner as in Synthesis Example 3 except that dimethylquinacridone was used in place of PV-23 (dioxazine violet), a similar reaction was conducted to obtain 2-bromoisobutyramidated quinacridone. This will be called "Quinacri-2".

Similarly, the structure of Quinacri-2 was confirmed by NMR and IR. By HPLC, its purity was determined to be 90.4%. By an elemental analysis, the bromine content was found to be 21.6%. A maximum absorption wavelength was measured by the spectrophotometer, and as a result, λmax=505 nm. The structural formula is shown below.

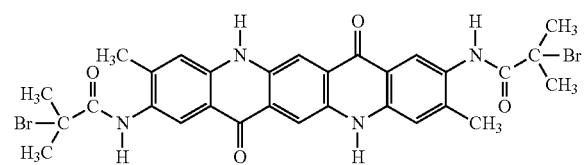 [SMILES: Cc1cc2[nH]c3cc4c(=O)c5cc(NC(=O)C(C)(C)Br)c(C)cc5[nH]c4cc3c(=O)c2cc1NC(=O)C(C)(C)Br]

Synthesis Example 14

Fluorescent Dye Initiator (Fluorescent-1)

In a similar manner as in Synthesis Example 4 except that 5-aminofluorescein was used in place of naphthol (ASBS-D), a 2-bromoisobutyramidated fluorescent dye was obtained. This will be called "Fluorescent-1".

Similarly, the structure of Fluorescent-1 was confirmed by NMR and IR. By HPLC, its purity was determined to be 98.40. By an elemental analysis, the bromine content was found to be 15.40. A maximum absorption wavelength was measured by the spectrophotometer, and as a result, λmax=494 nm. The structural formula is shown below.

Examples 1 to 9

To a reactor fitted with a stirrer, reflux condenser, thermometer, nitrogen inlet tube and dropping funnel, NMP (600 parts), Cyanine-4 (9 parts) obtained in Synthesis Example 1 and sodium iodide (8.334 parts) were added. While causing nitrogen to flow, the contents were heated at 80° C. for 1 hour. Subsequently, the contents were cooled to 50° C. A monomer mixture solution, which had been obtained by mixing and dissolving methyl methacrylate (MMA, 111 parts), azobisisobutyronitrile (AIBN, 1.82 parts) and diethyl phosphite (DEP, 0.766 parts), was added to a separate vessel and then heated to 70° C., at which polymerization was conducted for 5 hours. The polymerization mixture was sampled and measured for solid content. The solid content was found to be 17.4%. The polymerization mixture was then depressurized, and a portion (300 parts) of the NMP was driven off to concentrate the polymerization mixture.

After cooling, the concentrate was added to a 1:1 mixed aqueous solution (1,500 parts) of methanol and water while stirring the aqueous solution by a dissolver, whereby the polymerization product was precipitated. Dark green powdery precipitates were obtained. The precipitates were collected by filtration, washed with a fresh supply of the mixed aqueous solution, and then dried. Whitish green powder (98 parts) were obtained. Its yield was 98%. Its molecular weight was then measured by GPC. The number average molecular weight (Mn) determined by an RI detector was 13,000. Substantially no peak was observed corresponding to the raw material, Cyanine-4. By a UV detector (measurement wavelength: 245 nm) of GPC, no absorption was observed with usual polyMMA, but the dye polymer was confirmed to have an absorption when measured by the UV detector. In other words, the aromatic rings of the dye was considered to exist in the polymer. It was, therefore, possible to confirm that the dye was bonded to the polymer. The molecular weight (Mn) measured by the UV detector was 12,000, and therefore, was substantially the same as that determined by the RI detector.

By NMR, the content of the dye was found to be 7.1% from the number of protons in the aromatic rings of the dye and MMA. The dye polymer will be called "Cyanine Green Polymer-1". As a result of a thermal analysis, Tg was 92° C. and the thermal decomposition temperature under a nitrogen stream was 280° C. These Tg and thermal decomposition temperature were similar to those of polyMMA.

The solubility of the dye polymer in general organic solvents was also investigated. The dye polymer was diluted to give a solid content of 10%, and the solubility was determined depending on whether or not the resulting solution was clear and free of insolubles.

Soluble: toluene, xylene, MEK, ethyl acetate, DMF
Insoluble: hexane

It is to be noted that the raw material, Cyanine-4, was not soluble in the solvents other than DMF and remained in the form of solid powder.

Experiments were then conducted likewise with various catalysts and various monomers to obtain Cyanine Green Polymer-2 to Cyanine Green Polymer-9 as Examples 2-9. The results are summarized together with the results of Example 1 in Table 1.

examples, the dye polymers were confirmed to have UV absorptions in GPC measurements, and their molecular weights were substantially consistent with the molecular weights as determined by RI measurements.

Examples 10-17

A similar reactor as in Example 1 was used. NMP (600 parts), Disazo Red-2 (9 parts) obtained in Synthesis Example 7 and sodium iodide (4.77 parts) were added, and were processed in a similar manner as in Example 1. To a separate vessel, MMA (111 parts), AIBN (1.82 parts) and DEP (0.77 parts) were then added as a mixture, followed by polymerization at 70° C. for 5 hours. The solid content was 17.7%, and the monomer was polymerized substantially in its entirety. In

TABLE 1

| Ex. | Catalyst (C) | Monomer (M) (weight ratio) | Initiating agent (I) | M/X(initiating group)/I/C (molar ratio) | Yield (%) | Dye content (%) | Mn |
|---|---|---|---|---|---|---|---|
| 1 | DEP | MMA | AIBN | 3,175/80/37/18.5 | 98 | 7.1 | 13,000 |
| 2 | DEP | MMA | AIBN | 5,148/80/51.4/25.7 | 96.5 | 4.5 | 18,000 |
| 3 | DEP | MMA/2EHMA = 68/32 | AIBN | 2,665/80/34.3/17.1 | 95.5 | 7.4 | 16,500 |
| 4 | DEP | MMA/BMA/2EHMA = 50/33.3/16.7 | AIBN | 1,724.6/80/23.4/11.7 | 96 | 9.7 | 14,524 |
| 5 | DEP | MMA/BzMA/2EHMA = 48.6/32.4/16.2 | AIBN | 2,389/80/47.7/11.9 | 94.1 | 7.2 | 13,500 |
| 6 | DEP | MMA/BzMA/BMA/2EHMA = 40/20/10/30 | AIBN | 2,418/80/24.1/12.8 | 95.2 | 7.1 | 14,500 |
| 7 | NIS | MMA/AA = 75/25 | V-65 | 5,648/80/112.8/1.41 | 97.4 | 4.5 | 5,125 |
| 8 | NIS | MMA/AA = 77.5/22.5 | V-65 | 5,534/80/110.8/1.38 | 96.3 | 4.5 | 5,724 |
| 9 | NIS | MMA/AA = 80/20 | V-65 | 3.395/80/67.8/0.847 | 96.3 | 7.4 | 3,550 |

BMA: butyl methacrylate,
2EHMA: 2-ethylhexyl methacrylate,
BzMA: benzyl methacrylate
AA: acrylic acid,
NIS: N-iodosuccinimide,
V-65: azobisisovaleronitrile It has been found from Examples 1 and 2 that the molecular weight increases with the ratio of the monomer to the initiating groups. The molecular weight was controlled based on the amount of initiating groups. In Examples 3 to 6, it was possible to obtain dye polymers with random polymers of up to 4 components bonded therein.

In Examples 7 to 9, it was possible to obtain dye polymers, in which polymers having acid groups were bonded to the dyes, respectively, although the yields and molecular weights are not considered to be of true values because the dye polymers were adsorbed on the GP columns due to their acid groups. The polymers bonded to the dye polymers had acid values of 194 mgKOH/g in Example 7, 175 mgKOH/g in Example 8 and 155.8 mgKOH/g in Example 9. When the cyanine green polymers of Examples 7 to 9 were added to portions of a mixed solution of water and aqueous ammonia, respectively, bluish green aqueous solutions were formed so that those dye polymers according to the present invention were dissolved in water without precipitates. In all the a similar manner as in Example 1, after concentration, the polymerization product was precipitated in a mixed solvent of water and methanol. The precipitates were collected by filtration, washed, and then dried to obtain yellowish red Disazo Red Polymer-1 (120 parts).

Analyses were conducted in a similar manner as in Example 1. From NMR data, the dye content was found to be 7.4%. The Mn measured by the RI detector of GPC was 13,300. Further, an absorption corresponding to a molecular weight was observed in the UV range of GPC, and the molecular weight (Mn) was 13,200 which was similar to that measured by the RI detector. The introduction of the dye in the polymer was confirmed.

Experiments were then conducted likewise with various catalysts and monomers to obtain Disazo Red Polymer-2 to Disazo Red Polymer-8 as Examples 11-17. The results are summarized together with the results of Example 10 in Table 2.

TABLE 2

| Ex. | Catalyst (C) | Monomer (M) | Initiating agent (I) | M/X(initiating group)/I/C (molar ratio) | Yield (%) | Dye content (%) | Mn |
|---|---|---|---|---|---|---|---|
| 10 | DEP | MMA | AIBN | 5,333/80/53.3/26.7 | 93 | 7.4 | 13,300 |
| 11 | DEP | MMA | AIBN | 9,000/80/90/45 | 96 | 4.3 | 23,000 |
| 12 | DEP | MMA/RUVA(5.4 wt%) | AIBN | 5,500/80/55/27.5 | 97 | 7.2 | 13,200 |
| 13 | MEHQ | MMA | AIBN | 5,000/80/80/5 | 98 | 7.9 | 10,000 |
| 14 | BHT | BzMA | AIBN | 5,000/80/80/10 | 99 | 4.5 | 16,400 |
| 15 | BHT | MMA | AIBN | 8,000/80/80/10 | 99 | 5.0 | 15,300 |
| 16 | MI | MMA | AIBN | 5,500/80/80/1 | 97 | 7.8 | 9,400 |
| 17 | NIS | MMA/AA (23.7 wt%) | V-65 | 5,500/80/80/1 | 95 | 8.4 | 9,900 |

PUVA: 2-(2'-hydroxy-5-methacryloyloxyethylphenyl)-2H-benzotriazole,
BHT: 2,6-di-5-butylhydroxytoluene,
MEHQ: methoxyhydroquinone,
MI: maleimide Comparative Examples 1 and 2

An experiment was conducted in a similar manner as in Example 10 except that the monomer was passed through basic alumina to eliminate impurities such as a polymerization inhibitor for its purification and the catalyst was not used. This experiment will be designated as "Comparative Example 1". In addition, another experiment was also conducted in a similar manner as in Example 10 except that the halogen exchange reaction was not conducted. This experiment will be designated as "Comparative Example 2". In each of Comparative Example 1 and Comparative Example 2, polymerization was conducted and the yield was substantially 100%. When the molecular weights were measured, a molecular weight (Mn) of 23,000 was obtained by R1 measurement in Comparative Example 1, but no UV absorptions were observed in Comparative Example 1. Also in Comparative Example 1, the peaks of the raw materials were observed significantly. Similarly, in Comparative Example 2, the molecular weight measured by the RI detector was 21,500, no UV absorption was observed, and the peaks of the raw materials were observed significantly. Therefore, the dyes are not considered to be bonded to the polymers in Comparative Examples 1 and 2, and the catalyst and iodine-containing initiating groups in the present invention are believed to be needed.

Examples 18-33

Using the initiating-group-containing dyes of Synthesis Examples 2 to 6 and 8 to 12, various dye polymers were synthesized. In a similar manner as in the above-described examples, those dye polymers were experimented with various catalysts and monomers. The results are summarized in Tables 3 to 6.

TABLE 3

| Examples | 18 | 19 | 20 | 21 |
|---|---|---|---|---|
| Name | Cyanine Blue Polymer-1 | Cyanine Blue Polymer-2 | Dioxazine Polymer-1 | Disazo Blue Polymer-1 |
| Used Synthesis Example | Cyanine-1 | Cyanine-1 | Dioxazine-2 | Disazo Blue-2 |
| Catalyst (C) | DEP | SI | DEP | BHT |
| Monomer (M) (weight ratio) | MMA | MMA/AA = 76.5/23.5 | MMA/BMA/BzMA = 50/20/30 | MMA/MAA = 76.5/23.5 |
| Initiating agent (I) | AIBN | V-65 | AIBN | V-70 |
| M/X/C/I (molar ratio) | 8,000/80/40/20 | 5,950/80/95/1.2 | 5,000/80/40/10 | 5,117/80/81.3/1.01 |
| Yield (%) | 88 | 89 | 96 | 80.8 |
| Dye content (%) | 5.2 | 8.1 | 8.2 | 8.2 |
| Mn | 21,000 | 6,500 | 17,000 | 7,900 |

MAA: methacrylic acid, V-70: azobismethoxydimethylvaleronitrile (polymerization temperature: 40° C. when V-70 was used), SI: succinimide

TABLE 4

| Examples | 22 | 23 | 24 | 25 |
|---|---|---|---|---|
| Name | Disazo Blue Polymer-2 | Disazo Blue Polymer-3 | Monoazo Red Polymer-1 | Monoazo Red Polymer-2 |
| Used Synthesis Example | Disazo Blue-2 | Disazo Blue-2 | Monoazo Red-2 | Monoazo Red-2 |
| Catalyst (C) | DEP | DEP | IA | NIS |
| Monomer (M) (weight ratio) | MMA | MMA/RUVA = 94.6/5.4 | MMA/HEMA = 85/15 | MMA/MAA = 90/10 |
| Initiating agent (I) | AIBN | AIBN | AIBN | V-70 |
| M/X/C/I (molar ratio) | 4,300/80/43/21.5 | 5,100/80/53/26.5 | 4,000/80/80/10 | 4,000/80/80/1 |
| Yield (%) | 85 | 97 | 98 | 100 |
| Dye content (%) | 7.2 | 7.3 | 9.4 | 10 |
| Mn | 16,500 | 15,250 | 11,500 | 7,300 |

IA: t-butylxylenol, HEMA: hydroxyethyl methacrylate

TABLE 5

| Examples | 26 | 27 | 28 | 29 |
|---|---|---|---|---|
| Name | Perylene Polymer-1 | Azo Yellow Polymer-1 | Quinoline Polymer-1 | Benz Polymer-1 |
| Used Synthesis Example | Perylene-2 | Azo Yellow-1 | Quinoline-1 | Benz-1 |
| Catalyst (C) | SI | NIS | MI | BHT |
| Monomer (M) (weight ratio) | MMA/AA = 76.5/23.5 | MMA/AA = 90/10 | MMA | MMA/RUVA = 95/5 |
| Initiating agent (I) | V-65 | V-65 | AIBN | AIBN |
| M/X/C/I (molar ratio) | 4,000/80/80/1 | 3,500/80/80/1 | 2,000/80/80/1 | 6,000/80/80/10 |
| Yield (%) | 93 | 100 | 92 | 95 |
| Dye content (%) | 8.9 | 9.2 | 15 | 6.0 |
| Mn | 6,200 | 6,000 | 5,300 | 17,000 |

TABLE 6

| Examples | 30 | 31 | 32 | 33 |
|---|---|---|---|---|
| Name | Benz Polymer-2 | Quinacri Polymer-1 | Coupler Polymer-1 | Fluorescent Polymer-1 |
| Used Synthesis Example | Benz-1 | Quinacri-2 | Coupler-1 | Fluorescent-1 |
| Catalyst (C) | NIS | SI | SI | NIS |
| Monomer (M) (weight ratio) | MMA/AA = 85/15 | MMA/AA = 79/21 | MMA/AA = 85/15 | MMA/AA = 85/15 |
| Initiating agent (I) | V-65 | V-65 | V-65 | V-65 |
| M/X/C/I (molar ratio) | 4,000/80/80/1 | 5,700/80/75/1.25 | 4,000/80/80/1 | 2,000/80/80/1 |
| Yield (%) | 89 | 96 | 80 | 81 |
| Dye content (%) | 9.2 | 5 | 10.5 | 10.0 |
| Mn | 5,700 | 6,000 | 6,500 | 3,060 |

Example 34

A similar reactor as in Example 1 was used. Disazo Red-2 of Synthesis Example 7 (2 parts), NMP (200 parts) and sodium iodide (1.06 parts) were added, and a halogen exchange reaction was conducted likewise. MMA (28 parts), DEP (0.276 parts) and AIBN (0.656 parts) were then added, followed by polymerization at 70° C. for 1.5 hours. When immediately sampled, the yield of solids was 89%, Mn=12,000 when measured by the RI detector of GPC, and Mn=12,000 when measured by the UV detector of GPC. A mixture of BzMA (24.64 parts), DEP (0.0276 parts) and AIBN (0.065 parts) was then added, followed by polymerization at 70° C. for 3 hours. The resulting polymerization mixture was next processed in a similar manner as in Example 1 to collect the resultant polymer.

Its yield was 96%, and the dye was contained at 3.4%. Its Mn was 19,000. Further, the UV absorption increased owing to the inclusion of the aromatic ring of the BzMA, and its peak was similar to that measured by the RI detector and indicated Mn=19,400. The polymer was a block copolymer of the dye and polyMMA-polyBzMA, and therefore, it was possible to bind the dye to the block copolymer. This will be called "Disazo Red Polymer-9".

Example 35

A similar reactor as in Example 1 was used, and further, a dropping funnel was fitted. Disazo Yellow-2 of Synthesis Example 12 (2.5 parts), DMAc (200 parts) and sodium iodide (1.8 parts) were charged, and the contents were heated and stirred at 100° C. for 1 hour to conduct a halogen exchange. MMA (12 parts), AI (0.109 parts) and AIBN (1.0 parts) were then charged, followed by heating to 70° C. When the temperature had arisen to 70° C., a monomer mixture of MMA (12 parts) and AA (4.32 parts) was added dropwise over 3 hours, and subsequently, polymerization was conducted for 2 hours. Thereafter, similar processing as in Example 1 was conducted to obtain a polymer.

In a similar manner as in Example 1, analyses were conducted. From NMR data, the dye content was found to be 7.7%. The Mn measured by the RI detector of GPC was 8,500. Further, an absorption corresponding to a molecular weight was observed in the UV range of GPC, and the molecular weight (Mn) was 8,400 which was similar to that measured by the RI detector. The introduction of the dye in the polymer was confirmed. As the acrylic acid was gradually added, the dye polymer is a gradient copolymer in which acid groups increase in the growing direction of the polymer chain, that is, there is a gradient in the arrangement of monomer units. This will be called "Disazo Yellow Polymer-1".

Example 36

A similar reactor as in Example 1 was used, and further, a dropping funnel was fitted. Disazo Yellow-2 (2.5 parts) of Synthesis Example 12, DMAc (200 parts) and sodium iodide (1.8 parts) were charged, and the contents were heated and stirred at 100° C. for 1 hour to conduct a halogen exchange. MMA (16.1 parts), HEMA (5.9 parts), DEP (0.212 parts) and AIBN (0.5 parts) were then charged, followed by heating to 70° C. Polymerization was conducted for 2 hours, and the polymerization mixture was heated and stirred further at 85° C. for 2 hours. Then, hydroquinone (0.04 parts) was added, and further, acryloyloxyethyl isocyanate (4.879 parts) and NMP (4.879 parts) were added. A reaction was conducted at 70° C. for 2 hours. Polymerization proceeded to 100% in terms of solid content without gelation. An IR analysis was also conducted to confirm any absorption ascribable to the isocyanate. No absorption was observed at 2,100 cm$^{-1}$, and therefore, the isocyanate is considered to have reacted to the hydroxyl groups of the polymer.

Similar processing as in Example 1 was then conducted to obtain a polymer. In a similar manner as in Example 1, analyses were conducted. From NMR data, the dye content was found to be 7.5%. The Mn measured by the RI detector of GPC was 13,000. Further, an absorption corresponding to a molecular weight was observed in the UV range of GPC, and the molecular weight (Mn) was 12,800 which was similar to that measured by the RI detector. The introduction of the dye in the polymer was confirmed.

This is a dye polymer that has an addition-polymerizable, unsaturated bond in a side chain. This will be called "Disazo Yellow Polymer-2". Similarly, an unsaturated bond was introduced in Monoazo Red Polymer 1 to which the hydroxyl-containing polymer of Example 24 was bonded. This will be called "Monoazo Red Polymer-3".

Example 37

A similar reactor as in Example 1 was used. Disazo Red-2 (2 parts) of Synthesis Example 7, NMP (100 parts) and sodium iodide (1.06 parts) were added, and a halogen exchange reaction was conducted likewise. GMA (3.3 parts), NIS (0.0104 parts) and AIBN (0.61 parts) were then added, followed by polymerization at 75° C. for 1.0 hour. As a result of sampling, the yield was found to be 74% in terms of solid content. The Mn measured by the RI detector of GPC was 1,500, while the Mn measured by the UV detector of GPC was 1,436. A mixture of MMA (5.8 parts), BMA (4.9 parts), BzMA (4.1 parts), NIS (0.61 parts) and AIBN (0.61 parts) was then added, followed by polymerization at 75° C. for 4 hours. Subsequently, dibutylamine (3.0 parts) was added, and a reaction was conducted at 80° C. for 1 hour. In an IR spectrum, the peak ascribable to the glycidyl group at 940 cm$^{-1}$ was no longer observed, but a peak ascribable to a hydroxyl group formed after a ring-opening reaction of the glycidyl group was confirmed.

The polymerization mixture was then processed in a similar manner as in Example 1 to collect the polymer. The polymer was dissolved in a mixed solution of toluene and isopropanol, the resulting solution was titrated with a 0.1% solution of hydrogen chloride in IPA by an automatic titrator, and from a change in electrical conductivity, the amine number was found to be 52.3 mgKOH/g. The yield was 96%, and the dye was contained at 7.5%. Its Mn was 19,000, and the UV absorption increased owing to the inclusion of the aromatic ring of the BzMA, and its peak was similar to that measured by the RI detector and indicated Mn=19,400. This will be called "Disazo Red Polymer-10". This dye polymer is a block copolymer that the amino-containing polymer is bonded to the dye and a random copolymer of MMA, BMA and BzMA is bonded further.

Comparative Example 3

Into a reactor fitted with a stirrer, reflux condenser, thermometer, nitrogen inlet tube and dropping funnel, NMP (600 parts) and Cyanine-4 (6 parts) obtained in Synthesis Example 1 were added. The contents were stirred to dissolve Cyanine-4. MMA (60 parts) were then added, followed by bubbling of nitrogen for 30 minutes. While continuing the bubbling of nitrogen, cuprous bromide (1.68 parts) was added to the reactor, and further, pentamethyldiethylenetriamine (4.03 parts) was added. Slight exotherm was observed. The resulting mixture was heated, as it was, to 70° C.; at which polymerization was conducted for 5 hours. In a similar manner as in Example 1, the resulting polymer was precipitated. Then, the polymer was collected by filtration, washed with a similar mixed aqueous solution, and then dried. Whitish green powder (38 parts) were obtained. Its yield was 58.6%.

Its molecular weight was then measured by GPC. The number average molecular weight (Mn) determined by the RI detector was 13,000. Subsequently no peak was observed corresponding to the raw material, Cyanine-4. By the UV detector of GPC, an absorption was confirmed. Therefore, the aromatic rings of the dye were considered to exist in the polymer molecule. It was, therefore, possible to confirm that the dye was bonded to the polymer. The molecular weight (Mn) measured by the UV detector was 12,900, and therefore, was substantially the same as that determined by the RI detector. By NMR, the content of the dye was found to be 5.4% from the number of protons in the aromatic rings of the dye and MMA. When the dye polymer was subjected to an elemental analysis, it contained copper at 0.678%. The catalyst was deactivated under the influence of oxygen and the yield was poor, although the yield was substantially 100% in a similar experiment of the present invention. Further, copper which is a heavy metal was contained in the polymer, so that the dye polymer was not usable depending on the application.

Comparative Example 4

Polymerization was conducted in a similar manner as in Comparative Example 3 except that MMA (40 parts) and AA (10 parts) were used as monomers. Five hours later, the polymerization mixture was sampled and measured for solid content. As a result, no substantial polymerization was found to took place. This is presumably attributable to the inhibition by acrylic acid of the formation of a copper-ligand complex so that no polymerization was allowed to proceed. Although it is difficult for the ATRP process to conduct the polymerization of a monomer having an acid group, the present invention makes it possible to readily introduce acid groups into a dye polymer by using a monomer having an acid group.

Examples 38 to 41

In a similar manner as in Synthesis Example 5, composite pigments with a dye polymer contained therein were obtained by using aniline as an azo component and a mixture of Coupler Polymer-1, which was obtained in Example 32, and naphthol AS as a coupler component. As Comparative Example 5, a pigment was also prepared without using any coupler polymer. Those composite pigments and pigment are summarized in Table 7.

TABLE 7

| | Percentage of coupler polymer in coupler | Content of polymer in dye | Amount of acid derived from contained polymer |
|---|---|---|---|
| Ex. 38 | 100% | 87.4% | $28.6 \times 10^{-4}$ |
| Ex. 39 | 16.3% | 10.26% | $3.36 \times 10^{-4}$ |
| Ex. 40 | 23.3% | 14.92% | $4.89 \times 10^{-4}$ |
| Ex. 41 | 32.9% | 21.9% | $7.18 \times 10^{-4}$ |
| Comp. Ex. 5 | 0 | 0 | 0 |

Water was added to those dye polymer and composite pigments and the pigment of Comparative Example 5, respectively, to give a solid content of 100. Aqueous ammonia was added further, followed by stirring on magnetic stirrers. The pigment of Comparative Example 5 contained numerous coarse particles, and precipitates were observed. The composite pigment of Example 38 was readily dissolved in its entirety into a viscous solution. Concerning each of the composite pigments of Examples 39 to 41, polymer chains were neutralized with the alkali, and the neutralized polymer chains showed solubility to water, and the composite pigment was dispersed as fine particles. Those fine particles had an average particle size of 210 nm.

Those solutions and dispersions were stored at room temperature for one week. As a result, the composite pigment of Example 38 remained in the form of a solution free of settlings or the like. In the case of the pigment of Comparative Example 5, bronzing was observed and numerous coarse particles settled on the bottom. In the case of the composite pigment of Example 39, bronzing was observed a little, and precipitates were also observed on the bottom. Concerning the composite pigments of Examples 40 and 41, good dispersions were obtained without bronzing or settlings on the bottom. It has, therefore, been confirmed that these composite pigments are self-dispersing pigments capable of dispersing pigment particles through dissolution of their polymers.

Example 42

A solution, which had been prepared by dissolving in PGM (40 parts) a commercial brominated phthalocyanine blue pigment (PG-36, 100 parts), diethylene glycol (200 parts) and Cyanine Green Polymer-9 (10 parts) obtained in Example 9, and common salt (800 parts) were charged into a 3-L kneader. While controlling the kneader to maintain the temperature of the contents at from 100° C. to 120° C., the contents were milled for 8 hours to obtain a kneaded mixture. The kneaded mixture was poured into water (2,000 parts). The resulting mixture was heated to raise its temperature to 80° C., at which the mixture was then stirred at high speed for 4 hours. Filtration and washing were then conducted to obtain a wet pigment cake (pigment content: 29.3%). The thus-obtained wet cake (240 parts) was poured into water (1,000 parts) and deflocculated again. The resulting slurry was then filtered. The wet cake was washed, and dried at 80° C. for 24 hours to obtain a green composite pigment. As a result of an observation under TEM, the average particle size of primary particles was found to be about 30 nm. This will be called "Composite Pigment Green".

In a similar manner, "Composite Pigment Blue" was obtained using Cyanine Blue Polymer-2 of Example 19 in the case of the commercial ε-phthalocyanine blue pigment (PB-15:6), and "Composite Pigment Violet" was likewise obtained using Dioxazine Polymer-1 of Example 20 in the case of the commercial dioxazine violet pigment (PV-23).

Application Example 1

Application to Colored Microparticles

To a 1,000-mL flask, water (385 parts) and polyvinyl alcohol (DP=50%, 98% saponified; 12.5 parts) were added, and the polyvinyl alcohol was dissolved. To a separate vessel, methyl methacrylate (90 parts), Cyanine Green Polymer-1 (10 parts), butanediol diacrylate (1.5 parts) and azobisisobutyronitrile (1 parts) were added, and the Cyanine Green Polymer-1 was dissolved to obtain a monomer mixture. The Cyanine Green Polymer-1 was readily dissolved so that a bluish green color was imparted to the monomer mixture. A flask with an aqueous solution of polyvinyl alcohol contained therein was arranged on a high-speed rotary stirrer, the monomer mixture was added to the flask, and the resulting mixture was stirred at 2,000 revolutions for 5 minutes. The system changed into a bluish green color. When the mixture was sampled and observed under an optical microscope, the mixture was found to be in the form of blue-colored, spherical oil droplets of from 5 to 10 μm.

A reflux tube, thermometer and stirrer were next set on the flask, followed by polymerization at 60° C. for 1 hour and then at 80° C. for 3 hours. After cooling, the polymerization mixture was filtered, and then, the filter cake was washed with warm water, dried and ground. The thus-ground product had an external appearance of turquoise blue particles. When observed under an electron microscope and by a Coulter counter, the ground product was found to be in the shape of microparticles of from 5 to 10 μm. Those microparticles were substantially free of coagulated precipitates, and were also free of particles of irregular shapes other than spheres or precipitates of the dye polymer. The suspension polymerization was allowed to proceed well to obtain the colored microparticles. In a similar manner, it was possible to obtain yellowish red powder from Disazo Red Polymer-1, and also to obtain navy blue powder in the form of good microparticles from Disazo Blue-2.

For the sake of comparison, the raw material, Cyanine-4, was used in place of Cyanine Green Polymer-1 in a similar manner as described above. However, Cyanine-4 was not soluble in MMA and required dispersion. Using Disazo Red-2 in place of Disazo Red Polymer-1 and Disazo Blue-2 in place of Disazo Blue Polymer-2, these dyes were dissolved such that their concentrations became 0.75%. Suspension polymerization was similarly conducted to obtain colored microparticles. Those dye-polymer-containing microparticles and dye-containing polymer microparticles were immersed in toluene, ethyl acetate and MEK such that their concentrations became 5%, and were left over for 1 day. In the case of the dye-polymer-containing microparticles, the microparticles slightly swelled, but the supernatants were clear. The dye-containing polymer microparticles similarly swelled, and the supernatants were deeply tinged in the colors of the corresponding dyes. This is presumably attributable to the bleed-out of the dyes from the microcapsules.

As has been described above, excellent colored microparticles can be obtained without needing dispersion unlike pigments upon their synthesis, without coming-out of the dye from the resultant microcapsules, and without needing surface encapsulation for the prevention of such coming-out. The colored microparticles are useful as a plastic pigment or polymerized toner. As the colored microparticles can be dissolved in a monomer to polymerize the monomer, they are also useful for the bulk polymerization of MMA and the like.

Application Example 2

Application to Aqueous Pigment Dispersion

Quinacri Polymer-1 of Example 31 was added to water and neutralized with KOH such that Quinacri Polymer-1 was dissolved in the water with the solid content being adjusted to 25%. An aqueous dispersant solution was obtained. The aqueous dispersant solution was free of any undissolved dye, had a uniform dark reddish violet color, and was clear. To "CHROMOFINE MAGENTA 6887" (product of Dainichi Seika Color & Chemicals Mfg. Co., Ltd.; 100 parts) as a magenta pigment, the aqueous dispersant solution (100 parts), ethylene glycol (26.7 parts) and deionized water (173.3 parts) were added. They were mixed under stirring to prepare a mill base. After the mill base was fully dispersed by using a horizontal medium-containing dispersing machine, deionized water (100 parts) was added to the mill base to obtain a pigment dispersion having a pigment content of 20%.

To the dispersion (100 parts), ethylene glycol (51.0 parts), glycerin (33.0 parts), polyoxyethylene oleate (1 parts), a surfactant (0.8 parts), the aqueous dispersant solution (24 parts) the concentration of which had been adjusted to 40%, and deionized water (188 parts) were added, followed by stirring. The resulting dispersion was subjected to centrifugation (8,000 rpm, 20 minutes) to remove coarse particles, and was then filtered through a 5-μm membrane filter to obtain a magenta inkjet ink.

With respect to yellow, cyan and black colors, a similar procedure was carried out to obtain a yellow inkjet ink, cyan inkjet ink and black inkjet ink, respectively. For the yellow inkjet ink, "SEIKA FAST YELLOW A3" (product of Dainichi Seika Color & Chemicals Mfg. Co., Ltd.) and Azo Yellow Polymer-1 of Example 27 were used as a pigment and a dispersant, respectively. For the cyan inkjet ink, "Cyanine Blue KBM" (product of Dainichi Seika Color & Chemicals Mfg. Co., Ltd.) and Cyanine Blue Polymer-2 obtained in Example 19 were used as a pigment and a dispersant, respectively. For the black inkjet ink, carbon black ("RAVEN 250 POWDER(U)", product of Colombian Chemicals Company) and Cyanine Blue Polymer-2 obtained in Example 19 were used as a pigment and a dispersant, respectively.

The inkjet inks obtained as described above were separately filled in ink cartridges, and by an inkjet printer, solid printing was performed on inkjet glossy paper "PHOTOLIKE QP" (product of Konica Minolta Business Technologies, Inc.). After the print was left over for 24 hours in a room, its optical density and 20° gloss were measured by using "MAC-BETH RD-914" (manufactured by Gretag MacBeth GmbH) and "MICRO-TRI-GLOSS" (manufactured by BYK-Chemie GmbH), respectively. Further, vertical and horizontal lines were printed, and the print definition was visually observed to evaluate the quality of the print. As scratch resistance on glossy paper, the printed surface was rubbed with a finger to confirm whether or not the gloss was lowered. Moreover, each inkjet ink was stored at 70° C. for 7 days, and its viscosity and particle size were measured to determine its stability before and after the storage. The results are summarized in Table 8.

TABLE 8

|  |  | Inkjet inks of Application Example 2 | | | |
| --- | --- | --- | --- | --- | --- |
|  |  | Magenta | Cyan | Yellow | Black |
| Print quality | Optical density when printed at 100% on plain paper | 1.28 Good | 1.29 Good | 1.45 Excellent | 1.39 Excellent |
|  | Print alignment | No misalignment | No misalignment | No misalignment | No misalignment |
|  | 20° gloss when printed on glossy paper | 49 Excellent | 50 Excellent | 48 Excellent | 41 Excellent |
|  | Scratch resistance on glossy paper | Good | Good | Good | Good |
| Storability | Change in particle size | 2.3% decrease | 3.2% increase | 2.1% decrease | 3% decrease |
|  | Change in viscosity | 0.3% decrease | 0.5% decrease | 0.26% decrease | 0.4% decrease |

As the conditions of the prints formed with the inkjet inks obtained as described above by using the dye polymers as dispersants, the prints were very high in gloss, and the colors were developed well. The extremely good storage stability of each inkjet ink is presumably attributable to the exhibition of absorptivity by the dye component of the dye polymer to the pigment. With respect to a cyan color, similar effects were also available from the use of Disazo Blue Polymer-1 of Example 21. As to a yellow color, similar effects were also available from the use of Benz Polymer-2 of Example 30 or Disazo Yellow Polymer-1 (gradient-type dispersant) of Example 35.

Application Example 3

Application to UV-Curable Paint

A UV-curable paint was prepared as will be described next. Mixed under stirring were Disazo Yellow Polymer-2 (16.7 parts) obtained as a dye polymer containing unsaturated bonds in Example 36, a polyurethane polyester diol (a co-condensation polyester diol of terephthalic acid, sebacic acid, ethylene glycol and neopentyl glycol, average molecular weight: 2,000; 50 parts), a UV-curable urethane-based coating agent (a urethane compound obtained by reacting 19.2 parts of hydroxypropyl methacrylate with 22.2 parts of isophorone diisocyanate; 70 parts), trimethylolpropane triacrylate (15 parts), neopentyl glycol diacrylate (5 parts), an oligoester acrylate monomer (5 parts), 2-hydroxy-2-methylpropylphenone (3 parts), 2,2-diethoxyacetophenone (2 parts), isopropanol (45 parts), toluene (45 parts), and ethyl acetate (60 parts). The dye polymer was readily dissolved by the simple stirring, and a good UV-curable paint was obtained without insolubles.

The UV-curable paint obtained as described above was next spray-coated at a coat weight of 3 g/m² onto a polycarbonate plate, and was then cured at 50 m/min under high-pressure mercury vapor lamps (160 W/cm×3 lamps). It was possible to obtain a coated polycarbonate plate having a highly-transparent, yellow coating. Even when the coated plate was rubbed 200 times or more with a swab moistened with MEK, the coating remained free from separation, and the swab was still white, thereby demonstrating no migration of the pigment. In a similar manner, the UV-curable paint was also spray-coated onto a metal plate, and cured to obtain a coated metal plate having a transparent and beautiful coating. The coated metal plate was provided with similar durability. Similar results were also available from the use of Monoazo Red Polymer-3 described in Example 36. The dye polymer according to the present invention can be formulated into a paint by dissolving it in a solvent as described above, and therefore, is useful as a colorant capable of readily coloring oil-based paints and inks.

Application Example 4

Water-Based Paint

Perylene Polymer-1 obtained in Example 26 was formulated with water and aqueous ammonia into an aqueous solution having a solid content of 20%, whereby a perylene pigment dispersant was obtained. Perylene Polymer-1 was readily dissolved without insolubles. The dispersant solution (100 parts), a perylene pigment (PR-178, 100 parts) and water (300 parts) were charged into a ceramic ball mill, and the perylene pigment was dispersed for 24 hours to provide a dispersion for water-based paints. "WATERSOL S-126" (100 parts), "WATERSOL S-695" (5 parts), "WATERSOL S-6831M" (5 parts) and water (100 parts) were then combined and stirred. The dispersing solution (30 parts) was added, followed by stirring to obtain "Paint-1".

Paint-1 was applied onto a chromium-plated steel plate, and was then baked at 140° C. for 20 minutes. As a result, a transparent beautiful red coating was obtained. The coated plate was immersed for 30 minutes in boiling water, but the coating remained free from whitening, blister or separation. In addition, the coating developed the color well, and had a good gloss. Even when immersed in a 0.5% aqueous solution of sodium hydroxide, the coating remained free from separation, and the dye polymer did not come out. This is presumably attributable to the crosslinking of carboxyl groups of the dye polymer with the melamine crosslinking agent.

Similar good results were also obtained by using, in place of Perylene Polymer-1, a commercial chlorinated cyanine green as a green pigment together with Cyanine Green Polymer-7 to Cyanine Green Polymer-9 as dispersants. Even with Cyanine Green Polymer-7 having the high acid value, the waterproofness of the coating was good, and therefore, its carboxyl groups were presumably crosslinked with the melamine crosslinking agent. Further, the composite pigments obtained in Examples 40 and 41 were separately added to water, and subsequent to addition of ammonia, the resulting mixtures were stirred. The composite pigments were readily dispersed so that pigment dispersions were obtained. Using those pigment dispersions in place of the above-described dispersant for water-based paints, paints were prepared. Those paints were similarly applied and tested. It was found that good coatings were obtained.

Application Example 5

Application to Electrophotographic Dry Developer

To fine powder (70 parts) of a polyester resin (softening point: 105° C., glass transition point: 53° C., number average molecular weight: 6,000) formed from a propylene oxide adduct of bisphenol A and fumaric acid, Quinoline Polymer-1 (30 parts) obtained in Example 28 was added. The resulting mixture was stirred and mixed. The thus-obtained mass was melted and kneaded by a two-roll mill. At the time point that the mass had been melted, the dye became readily miscible and granules were no longer contained. The melt was then cooled and granulated to obtain a granulated product of a high-concentration coloring composition containing the yellow dye at 4.5%. The granulated product was placed on a slide glass, heated and melted, and then observed under a microscope. Coarse particles, insolubles or the like were not observed.

The high-concentration coloring composition (11 parts) containing the yellow dye, a chromium-complex-based, negative charge control agent (3 parts) and a polyester resin (86 parts) of the same kind as that used above were kneaded by a method known per se in the art. The kneaded mass was cooled, granulated, comminuted by a jet mill, and then classified to obtain fine powder of from 5 to 20 μm. Colloidal silica was added as a fluidizer, and the resulting powder was mixed with magnetic iron powder as a carrier. Using the thus-obtained mixture as an electrophotographic dry developer of yellow color, copying was performed by a full-color electrophotographic copying machine. A vivid yellow image was obtained.

Application Example 6

Application to Stationery

Fluorescent Polymer-1 obtained in Example 33 was added to water, and sodium hydroxide was added to dissolve Fluorescent Polymer-1 in water, whereby a yellow solution having a solid content of 15% was obtained. The yellow solution (100 parts), water (73 parts), ethylene glycol (13 parts), glycerin (4 parts) and thiourea (10 parts) were combined together, followed by stirring for 10 minutes. A water-based fluorescent color the viscosity of which was 5.3 mPa·s was obtained.

The water-based fluorescent color was filled in a felt-tip pen made of plastics and having a core and a pen point formed by a plastic forming process, and was then tested. Using the felt-tip pen, writing was performed on paper. No offset took place, and a clear fluorescent writing quality was obtained. When writing was performed on a polyethylene film, good writing was feasible without repellence. The ink was not scratched off even when rubbed with a nail. Using Monoazo Red Polymer-2 of Example 25, a red pen was also produced likewise. It showed good writing performance.

Application Example 7

Application to Oil-Based Pigment Dispersions (Part 1)

To aliquots (50 parts, each) of an acrylic resin varnish (obtained by polymerization of benzyl methacrylate, methacrylic acid and 2-hydroxyethyl methacrylate at a molar ratio of 70:15:15, molecular weight: 12,000, acid value: 100 mgKOH/g, PGMAc solution having a solid content of 40%), the composite pigment green, composite pigment blue and composite pigment violet (15 parts, each) obtained in Example 42 were added, respectively. To each of the resulting mixtures, a polyester-polyamide dispersant (reaction product of polycaprolactone and polyethylenimine in the presence of 12-hydroxystearic acid as an initiator, solid content: 46%; 10 parts) and PGMAc (25 parts) were added. After premixing, the resulting mixtures were separately dispersed in a horizontal bead mill to obtain pigment dispersions of the respective colors. The average particle size of the pigment in the thus-obtained pigment dispersion of each color was measured. The average particle size was found to be approximately from 40 to 55 nm. The respective dispersions were also measured for viscosity. The particle sizes and viscosities of the respective dispersions are summarized in Table 9.

TABLE 9

| Pigment dispersions | Composite pigments | Average particle size (nm) | Viscosity (mPa · s) |
|---|---|---|---|
| G-1 | Composite pigment green | 49 | 9.8 |
| B-1 | Composite pigment blue | 41 | 8.9 |
| V-1 | Composite pigment violet | 48 | 9.5 |

Application Example 8

Application to Oil-Based Pigment Dispersions (Part 2)

To a further aliquot (50 parts) of the acrylic resin varnish (obtained by polymerization of benzyl methacrylate, methacrylic acid and 2-hydroxyethyl methacrylate at a molar ratio of 70:15:15, molecular weight: 12,000, acid value: 100 mgKOH/g, PGMAc solution having the solid content of 40%), a diketopyrrolopyrrole pigment (PR-254 microparticulated by milling, average particle size: 32 nm; 15 parts), a PGMAc solution (solid content: 40%; 10 parts) of Disazo Red Polymer-10 obtained as an amino-containing block copolymer in Example 37, and PGMAc (25 parts) were added. After premixing, the resulting mixture was dispersed in a horizontal bead mill to obtain a pigment dispersion. The average particle size of the pigment in the thus-obtained pigment dispersion was measured. The average particle size was found to be approximately 45 nm. The dispersion was also measured for viscosity. The viscosity was found to be 11.6 mPa·s. This will be called "Pigment Dispersion R-1".

To a nickel-azo complex pigment (PY-150 microparticulated likewise by milling, average particle size: 41 nm), Benz Polymer-1 of Example 29 was added as a dispersant to obtain Pigment Dispersion Y-1. The average particle size was 57 nm, while the viscosity was 6.2 mPa·s. Those pigment dispersions were stored at 45° C. for 4 days to determine changes in viscosity. Those changes were all smaller than 3%, thereby demonstrating good storage stability. Using the above-obtained five kinds of pigment dispersions as colors for image displays, an RGB color filter was fabricated. The RGB color filter had excellent spectral curve characteristics, was excellent in durability such as light fastness and heat resistance, also had superb properties in contrast and light transmission, and therefore, showed excellent properties for the display of images.

Application Example 9

Application to Plastic Coloring Agents

After Cyanine Green Polymer-2 (10 parts) obtained in Example 2, pellets (490 parts) of methyl methacrylate resin (specific gravity: 1.5, MFR: 2 g/min) and 2-(3'-t-butyl-5'-methyl-2'-hydroxyphenyl)-2H-5-chlo robenzotriazole (0.5 parts) were mixed, the resulting mixture was extruded and granulated once at 250° C. through a single-screw laboratory extruder to prepare a master batch containing the dye polymer at 2%. The 2% master batch was then blended with methyl methacrylate resin such that the amount of the dye polymer became 0.5%. The resulting blend was similarly extruded once, and was then formed into a plate by a laboratory forming machine. A highly-transparent green plate was obtained.

Separately using Disazo Red Polymer-3 obtained in Example 12, Disazo Blue Polymer-3 obtained in Example 23 and Benz Polymer-1 obtained in Example 29, transparent, granule-free, beautiful plates were obtained, respectively. The dye polymers melted and dissolved in the PMMA as the base resin. It was, therefore, possible to obtain the colored plastics with ease.

For the sake of comparison, the dyes as the raw materials for the respective dye polymers were separately charged to give the same concentration, and similar plates were formed. Upon extrusion, the dyes were observed to scatter around from a vent of the extruder. In contrast, the dye polymers according to the present invention did not scatter around as they were melted and mixed.

Those plates were stored for 1 week in a constant-temperature chamber controlled at 50° C., and their surfaces were inspected. In the cases of the dye polymers, no bleed-out took place. In the cases of the dyes, on the other hand, waste cloths were slightly colored when surfaces of the plates were wiped with the waste cloths. The dyes are presumed to have bled out under heat. Unlike pigments, the dye polymers do not require dispersion by increasing the number of passes, and can be mixed in plastics to readily color them. Unlike dyes, the dye polymers neither scatter around nor bleed out.

Industrial Applicability

When used as a pigment dispersant, the dye polymer according to the present invention can give a good pigment dispersion. When the dye polymer according to the present invention is used singly or as a composite pigment, it can be used as a good coloring agent, can readily color products or articles, and can apply colored coatings or the like to the products or articles. These coatings or the like are high in transparency, and can provide the products or articles with high added value.

The invention claimed is:

1. A production process of a dye polymer having a dye content of from 1 to 50 wt %, the process comprising
    a living radical polymerization process which uses a dye having a polymerization initiating group as a polymerization initiator and in which a radical in the polymerization initiating group is formed by using a catalyst and then an addition-polymerizable monomer reacts to the radical,
    wherein the polymerization initiating group is a group of the following formula (1):

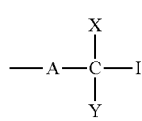
(1)

wherein X and Y may be the same or different and each represent a hydrogen atom, hydrocarbon group, halogen atom, cyano group, alkoxycarbonyl group, allyloxycarbonyl group, acyloxy group, allyloxy group, alkoxy group, alkylcarbonyl group or allylcarbonyl group, and A represents a connecting group to the dye,
    wherein the catalyst is a compound capable of converting into a radical and is selected from an iodine-containing phosphorus halide, a phosphite compound or a phosphinate compound, an imide compound, a phenol compound, an iodoxyphenyl compound and a vitamin, and
    wherein a catalyst radical is generated from the catalyst with reacting a free radical generated from organic peroxides or azo compounds to the catalyst and then the catalyst radical generates the radical in the polymerization initiating group by extracting the iodine atom from the group of the formula (1).

2. A production process of a dye polymer having a dye content of from 1 to 50 wt %, the process comprising
    a living radical polymerization process which uses a dye raw compound having a polymerization initiating group as a polymerization initiator and in which a radical in the polymerization initiating group is formed by using a catalyst and then an addition-polymerizable monomer reacts to the radical, and
    a process of converting the dye raw compound into a dye,
    wherein the polymerization initiating group is a group of the following formula (1):

(1)

wherein X and Y may be the same or different and each represent a hydrogen atom, hydrocarbon group, halogen atom, cyano group, alkoxycarbonyl group, allyloxycarbonyl group, acyloxy group, allyloxy group, alkoxy group, alkylcarbonyl group or allylcarbonyl group, and A represents a connecting group to the dye raw compound,
    wherein the catalyst is a compound capable of converting into a radical and is selected from an iodine-containing phosphorus halide, a phosphite compound or a phosphinate compound, an imide compound, a phenol compound, an iodoxyphenyl compound and a vitamin, and
    wherein a catalyst radical is generated from the catalyst with reacting a free radical generated from organic peroxides or azo compounds to the catalyst and then the catalyst radical generates the radical in the polymerization initiating group by extracting the iodine atom from the group of the formula (1).

3. The production process according to claim 1, wherein the dye having the group of the formula (1) has been obtained by halogen exchange from a dye having a group of the formula (1) in which I (iodine) replaced bromine or chlorine.

4. The production process according to claim 1, wherein the dye is an azo, cyanine, phthalocyanine, perylene, perinone, diketopyrrolopyrrole, quinacridone, isoindolinone, isoindoline, azomethine, dioxazine, quinophthalone, anthraquinone, indigo, azo-metal complex, quinoline, diphenylmethane, triphenylmethane, xanthene, Lumogen, coumarin, fluorescein or fluorescent dye.

5. The production process according to claim 1, wherein a polymer bonded to the dye is a homopolymer, random copolymer, block copolymer or gradient copolymer, having a number average molecular weight of from 1,000 to 50,000.

6. The production process according to claim 1, wherein the addition-polymerizable monomer has a carboxyl group, sulfonic group or phosphoric group, and the resultant dye polymer is neutralized with an alkaline substance to provide the dye polymer with water solubility.

7. The production process according to claim 2, wherein the dye raw compound having the group of the formula (1) has been obtained by halogen exchange from a dye raw material having a group of the formula (1) in which I (iodine) replaced bromine or chlorine.

8. The production process according to claim 2, wherein the dye raw compound is a raw compound for a dye of an azo, cyanine, phthalocyanine, perylene, perinone, diketopyrrolopyrrole, quinacridone, isoindolinone, isoindoline, azomethine, dioxazine, quinophthalone, anthraquinone, indigo, azo-metal complex, quinoline, diphenylmethane, triphenylmethane, xanthene, Lumogen, coumarin, fluorescein or fluorescent dye.

9. The production process according to claim 2, wherein a polymer bonded to the dye is a homopolymer, random copolymer, block copolymer or gradient copolymer, having a number average molecular weight of from 1,000 to 50,000.

10. The production process according to claim 2, wherein the addition-polymerizable monomer has a carboxyl group, sulfonic group or phosphoric group, and the resultant dye polymer is neutralized with an alkaline substance to provide the dye polymer with water solubility.

* * * * *